United States Patent
Matei

(10) Patent No.: US 12,122,033 B2
(45) Date of Patent: Oct. 22, 2024

(54) APPARATUS AND METHOD OF AN INTERACTIVE POWER TOOL

(71) Applicant: ROBBOX INC., Richmond (CA)

(72) Inventor: Andrei Matei, Coquitlam (CA)

(73) Assignee: ROBBOX INC., Richmond (CA)

( * ) Notice: Subject to any disclaimer, the term of this patent is extended or adjusted under 35 U.S.C. 154(b) by 466 days.

(21) Appl. No.: 17/142,807

(22) Filed: Jan. 6, 2021

(65) Prior Publication Data

US 2021/0205976 A1 Jul. 8, 2021

Related U.S. Application Data

(60) Provisional application No. 62/959,038, filed on Jan. 9, 2020, provisional application No. 62/957,751, filed on Jan. 6, 2020.

(51) Int. Cl.
| | |
|---|---|
| *B25F 5/02* | (2006.01) |
| *B23B 49/00* | (2006.01) |
| *G08B 7/06* | (2006.01) |
| *B25B 23/147* | (2006.01) |
| *B25F 5/00* | (2006.01) |
| *G06F 3/04842* | (2022.01) |
| *G09B 5/02* | (2006.01) |
| *G09B 19/24* | (2006.01) |

(52) U.S. Cl.
CPC .............. *B25F 5/02* (2013.01); *B23B 49/00* (2013.01); *G08B 7/06* (2013.01); *B25B 23/147* (2013.01); *B25F 5/001* (2013.01); *G06F 3/04842* (2013.01); *G09B 5/02* (2013.01); *G09B 19/24* (2013.01)

(58) Field of Classification Search
CPC .................................. B25F 5/02; B23B 49/00
See application file for complete search history.

(56) References Cited

U.S. PATENT DOCUMENTS

| | | | | |
|---|---|---|---|---|
| 4,317,176 A * | 2/1982 | Saar | ................... | G05B 19/4163 318/434 |
| 5,105,130 A * | 4/1992 | Barker | ..................... | B25F 5/00 318/268 |
| 5,404,021 A * | 4/1995 | Mangano | ............ | G01B 11/105 250/559.39 |
| 7,182,148 B1 * | 2/2007 | Szieff | .................. | B25H 1/0078 173/171 |
| 7,200,516 B1 * | 4/2007 | Cowley | .................. | B23B 49/00 356/138 |

(Continued)

*Primary Examiner* — Lucas E. A. Palmer
(74) *Attorney, Agent, or Firm* — Oblon, McClelland, Maier & Neustadt, L.L.P.

(57) ABSTRACT

The present disclosure is directed to a handheld power tool with a touch screen. In an embodiment, the interactive power tool comprises a power source, a video display mounted on a surface of a housing, the video display being integrated with a touch sensitive display, one or more sensors attached to the housing, and processing circuitry, within the housing and electrically coupled to the power source, configured to identify a type of an attachment connected to the interactive power tool, switch the video display to display image data associated with the type of the attachment, receive sensor data from the one or more sensors, and update the image data based on the received sensor data from the one or more sensors.

20 Claims, 21 Drawing Sheets

(56) References Cited

U.S. PATENT DOCUMENTS

| | | | | |
|---|---|---|---|---|
| 11,697,200 | B2* | 7/2023 | Rusch | B25B 23/14 81/57 |
| 2005/0232713 | A1* | 10/2005 | Turner | B25H 1/0092 408/16 |
| 2011/0245833 | A1* | 10/2011 | Anderson | B23B 49/02 606/80 |
| 2012/0007748 | A1* | 1/2012 | Forgues | B24D 13/10 340/870.07 |
| 2012/0162406 | A1* | 6/2012 | Schmidt | B23B 49/00 348/95 |
| 2013/0193891 | A1* | 8/2013 | Wood | H02P 6/08 318/434 |
| 2014/0184397 | A1* | 7/2014 | Volpert | G05B 19/05 340/12.51 |
| 2016/0088482 | A1* | 3/2016 | Zeiler | H04W 12/12 455/426.1 |
| 2016/0226278 | A1* | 8/2016 | Wenger | H02J 7/0044 |
| 2016/0325391 | A1* | 11/2016 | Stampfl | H04Q 9/00 |
| 2016/0354889 | A1* | 12/2016 | Ely | B23Q 17/2404 |
| 2016/0378097 | A1* | 12/2016 | Crescenti | B25F 5/00 700/170 |
| 2017/0014984 | A1* | 1/2017 | Rola | B25F 5/00 |
| 2017/0201853 | A1* | 7/2017 | Chen | H04W 4/80 |
| 2017/0222382 | A1* | 8/2017 | Peloquin | H01R 27/02 |
| 2017/0251589 | A1* | 9/2017 | Tippery | A01B 51/02 |
| 2017/0368674 | A1* | 12/2017 | Wise | B25F 3/00 |
| 2018/0178366 | A1* | 6/2018 | Matei | B25B 21/00 |
| 2018/0185993 | A1* | 7/2018 | Hita | B25F 5/00 |
| 2019/0227528 | A1* | 7/2019 | Abbott | G06N 20/00 |
| 2020/0027458 | A1* | 1/2020 | Torok | B25F 5/00 |
| 2020/0389110 | A1* | 12/2020 | Yajurvedi | H02P 29/0241 |
| 2021/0046601 | A1* | 2/2021 | Crivella | B23Q 17/2233 |
| 2021/0245267 | A1* | 8/2021 | Crivella | B23B 35/00 |
| 2022/0115969 | A1* | 4/2022 | Murui | H02K 11/33 |

* cited by examiner

APPARATUS AND METHOD OF AN INTERACTIVE POWER TOOL

CROSS-REFERENCE TO RELATED APPLICATIONS

The present application claims priority to U.S. Provisional Application No. 62/957,751, filed Jan. 6, 2020, and claims priority to U.S. Provisional Application No. 62/959,038, filed Jan. 9, 2020, the teachings of which are hereby incorporated by reference in its entirety for all purposes.

FIELD

This present disclosure relates to a handheld power tool with a touch screen.

BACKGROUND

It has been said by some that a tool is only as good as its user. Yet, there is virtually no aspect of interactivity between the tool and its users. Often, the burden falls on the user to figure out how to best use the tool. Users are often left on their own to find the most appropriate tool, configure the tool, identify compatible components, perform measurements, understand an instruction manual, and so forth. Therefore, having a tool that can provide a more interactive experience, such as providing feedback or receiving user input, can be of use to a user.

SUMMARY

The present disclosure is directed to an interactive power tool.

According to an embodiment, the present disclosure further relates to an interactive power tool, comprising a power source, a video display mounted on a surface of a housing, the video display being integrated with a touch sensitive display, one or more sensors attached to the housing, and processing circuitry, within the housing and electrically coupled to the power source, configured to identify a type of attachment connected to the interactive power tool, dynamically switch the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool, receive sensor data from the one or more sensors, and update the image data based on the received sensor data from the one or more sensors.

According to an embodiment, the present disclosure further relates to a method for configuring an interactive power tool, comprising identifying, by processing circuitry, a type of attachment connected to an interactive power tool including a power source, a video display mounted on a surface of a housing, the video display being integrated with a touch sensitive display, and one or more sensors attached to the housing, dynamically switching, by the processing circuitry, the video display to display image data associated with the type of attachment and to display selectable options actuatable via the touch sensitive display corresponding to functionality of the attachment in response to identification of the type of attachment connected to the interactive power tool, receiving, by the processing circuitry, sensor data from the one or more sensors, and updating, by the processing circuitry, the image data based on the received sensor data from the one or more sensors.

DETAILED DESCRIPTION

Figure 1:
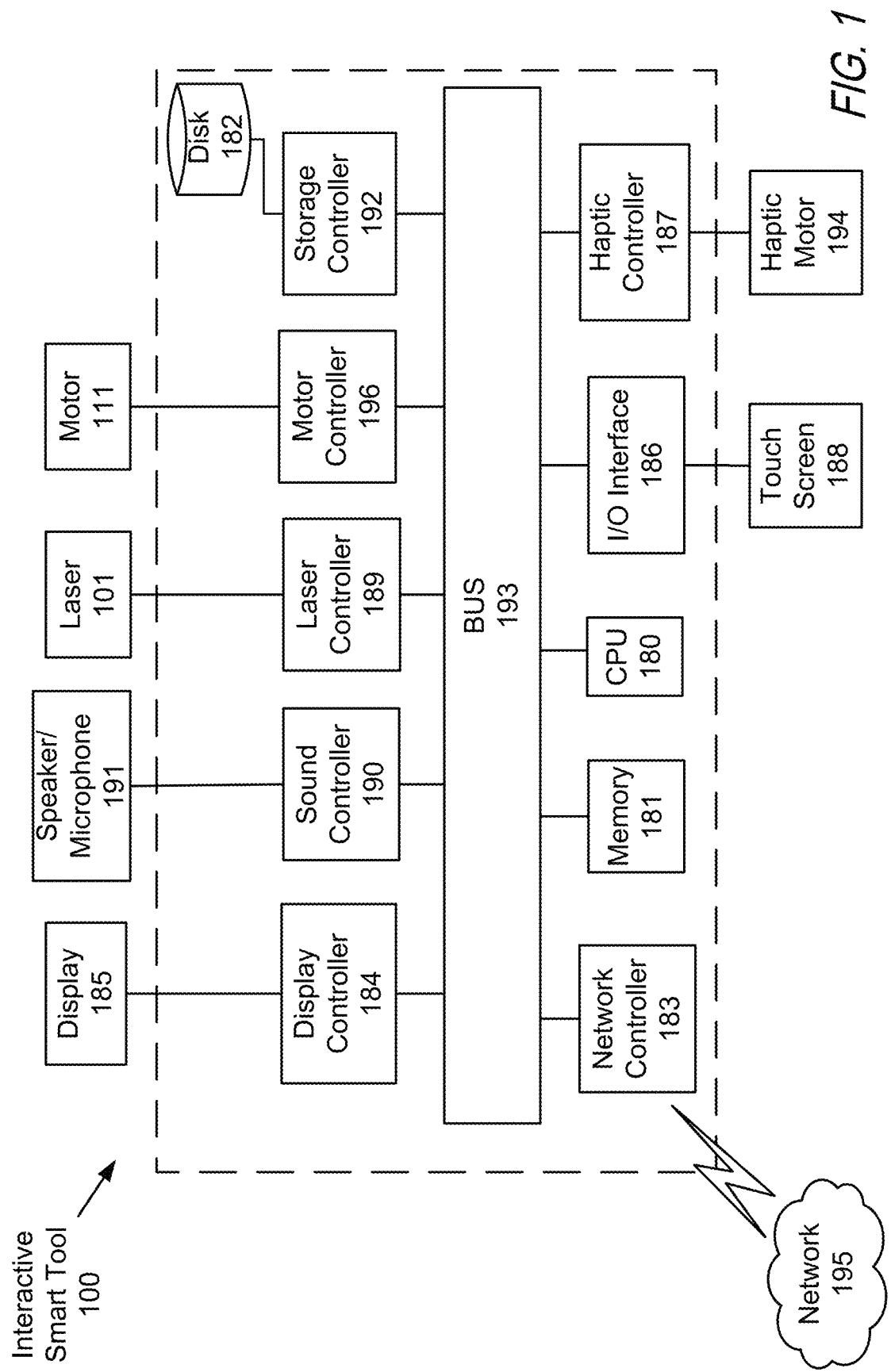
FIG. 1 is hardware diagram describing an interactive smart tool, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "attachment" and "end effector" may be used interchangeably throughout the application in order to refer to the same component of the system.

This disclosure relates to an interactive smart tool capable of interacting with a user. The tool, which can be a power hand tool, can include components such as a touch display, (primary) motor, haptic motor, processor, power source, memory, motor controller, sensors, network controller, and more. The user can control the various components in the tool using the touch display. The touch display can be a touch screen, a display, or a combination thereof, in a manner consistent with common smart devices outfitted with a display. The tool can also provide output back to a user, such as a vibratory alert when a task has been completed or a tutorial video displayed via the touch display. Furthermore, the interactive smart tool can be modular and be able to accept and control a variety of add-on attachments using its motor.

According to an embodiment, a touch display with an integrated microprocessor allows a tool operator to have quick control of multiple senses, or features, on a tool in addition to access to features and menus and other information via wireless connectivity. The tool may be a power tool and may be a hand held power tool. In this way, the tool may receive feedback, information and menus, and connect to other devices. A menu of the touch display can continually change depending on the applications or requirement at the time, and may be updated from a local server, a cloud server, or third party devices.

In an embodiment, the tool may receive e-commerce information and display the e-commerce information on the tool. It can be appreciated that display of the e-commerce information may be performed via the touch display.

According to an embodiment, a touch display with an integrated microprocessor allows for a connection between a tool, a tool operator thereof, and a third party wireless device. The third party wireless device may be associated with a manufacturer, a distributor, and the like, and may be configured to directly communicate information to the tool operator via the tool.

In an embodiment, a third party, via the third party wireless device, can send instructions, maintenance information, artificial intelligence-related data, and the like, to a screen of the tool in the form of, among others, videos and images. In an embodiment, the third party can receive feedback from the tool operator, including how the tool operator uses the tool, through the touch display of the tool. The use of the tool of the tool operator includes behavior related to controlling, sending, and receiving tasks and reading and viewing information. The behavior can manifest as a touch, a double touch, or a swipe of the touch display.

According to an embodiment, the interactive power tool can receive controls, tasks, and the like, directly from the third party and display the received information on the touch display of the tool. The displayed information may include a specific image that may be displayed on the tool without input from the tool operator.

According to an embodiment, the tool operator can control torque levels, speed levels, a video camera, a laser measuring module, a gyroscope, a magnetometer, stud finders, voice command, a speaker, battery levels, and other features integrated with the tool through the touch display. The tool operator can receive instruction and feedback data through images or videos displayed on the touch display.

In an embodiment, the touch display can automatically change and display a different menu or graphics based on different inputs from other integrated features without operator input. The touch display can control or display features that include, among others, laser measuring modules, video cameras, stud finders, a Near Field Communication (NFC) module, a temperature sensor, a battery management system, a motor control module, and other features that can be integrated into the tool.

The tool can provide feedback to a user by displaying data collected from internal components of the tool, data sent from external devices, notifications sent from remote sources or third-parties, process instructions stored in a tools internal memory or sent from a remote server using wireless communication, or information generated from applications stored in the tools internal memory. The type of visual feedback can vary and be updated automatically depending on user input, voice commands, changes to the current application, new data from internal components or sensors, new data from external devices, remote software updates, notifications or updates from third parties, and so forth.

In addition to providing feedback, the tool can receive and track input. The tool can provide a user with a range of options to control integrated components, navigate menus, configure settings, interact with external devices wirelessly connected to the tool, and so forth. Touch can allow a user to use a range of gestures to interact with the tool, including tap, double-tap, touch-and-hold, multi-touch, swipe, multi-finger swipe, pinch, drag, and more. Input via touch can allow a user to configure, control, and interact with modules built in the tool, including: motors (set torque levels, speed levels, direction, lock mode, et cetera), image sensors (take image, take video, et cetera), laser measuring modules, accelerometers, gyroscopes, magnetometers, stud finders, microphones, speakers, battery management systems, Bluetooth modules, Wi-Fi modules, NFC modules, GPS modules, temperature sensors, humidity sensors, or other components that can be integrated on or in the body of the tool. Lastly, information gathered through the user's interaction with the tool can be stored in the tool and analyzed, or transmitted wirelessly to external storage or on a remote cloud-based server, where AI algorithms, machine learning, deep learning, statistical models, or other predictive algorithms can be applied to the data.

FIG. 1 provides a hardware description for one embodiment an interactive smart tool 100, according to exemplary embodiments of the present disclosure. In an example, FIG. 1 describes an interactive smart tool 100 including a single processing circuitry in communication with and controlling power tool components such as the display. In another example, FIG. 1 describes an interactive smart tool 100 having multiple processing circuitries. In each of the non-limiting examples described above/below, the display may be a user interface responsive to user input. For brevity, certain assembly components described above have been omitted.

In FIG. 1, the interactive smart tool 100 includes a CPU 180 which performs the processes described herein. The process data and instructions may be stored in memory 181. The memory 181 can include RAM memory, flash memory, or any other viable memory type. These processes and instructions may also be stored on a storage medium disk 182 such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the interactive smart tool 100 communicates, such as a server or computer.

Further, the claimed advancements may be provided as a utility application, background daemon, or component of an operating system, or combination thereof, executing in conjunction with CPU 180 and an operating system such as Microsoft Windows 7, UNIX, Solaris, LINUX, Apple MAC-OS and other systems known to those skilled in the art.

The hardware elements in order to achieve the interactive smart tool 100 may be realized by various circuitry elements, known to those skilled in the art. For example, CPU 180 may be a specially-programmed Xenon or Core processor from Intel of America or an Opteron processor from AMD of America, or may be other processor types that would be recognized by one of ordinary skill in the art. For instance, the CPU 180 may be an Arm® Cortex®-M processor. Alternatively, the CPU 180 may be implemented on an FPGA, ASIC, PLD or using discrete logic circuits, as one of ordinary skill in the art would recognize. Further, CPU 180 may be implemented as multiple processors cooperatively working in parallel to perform the instructions of the inventive processes described herein.

The interactive smart tool 100 in FIG. 1 also can include a network controller 183, such as an Intel Ethernet PRO network interface card from Intel Corporation of America, for interfacing with the network 195. As can be appreciated, the network 195 can be a public network, such as the Internet, or a private network such as an LAN or WAN network, or any combination thereof and can also include PSTN or ISDN sub-networks. The network 195 can be wired, such as via an Ethernet network, or can be wireless, such as via a cellular network including EDGE, 3G, 4G, and 5G wireless cellular systems. The wireless network can also be Wi-Fi, Bluetooth, NFC, radio frequency identification device, or any other wireless form of communication that is known.

The interactive smart tool 100 further includes a display controller 184, such as a NVIDIA GeForce GTX or Quadro graphics adaptor from NVIDIA Corporation of America for interfacing with a display 185, such as a Hewlett Packard HPL145w LCD monitor. In an embodiment, the display 185 is a flexible OLED touch screen 188. In one embodiment, the display 185 and touch screen 188 are round. In another embodiment, the display 185 and touch screen 188 have a diameter of 1.2 to 2 inches.

According to an embodiment, a general purpose I/O interface 186 interfaces the touch screen 188 on or separate from display 185. In an embodiment, the touch screen 188 may be implemented via capacitive sensor, resistive sensor, and the like.

It can be appreciated that the general purpose I/O interface 186 may be configured to be a special purpose I/O interface for communication with and control of one or more peripheral features of the interactive smart tool 100. The one or more peripheral features can include, among others, image sensors (e.g. cameras), inertial measurement units (IMUs) (e.g. accelerometers, gyroscopes, magnetometers), humidity sensors, and temperature sensors. The magnetometers may be implemented in combination in order to identify studs within a structure. The studs may also be identified by capacitance measurements, radar systems, and the like.

A sound controller 190 is also provided in the interactive smart tool 100, such as Sound Blaster X-Fi Titanium from Creative, to interface with speakers/microphone 191, thereby providing sounds and/or music. In an embodiment, the speakers/microphone 191 allow for voice control of the interactive smart tool 100 and for providing notifications to the user of pertinent events.

A laser controller 189 is also provided in the interactive smart tool 100 to interface with a laser 101 comprising laser emitting diodes and laser receivers. In an embodiment, the laser controller 189 is configured to control the operation of a laser emitting diode and laser receiver. In one embodiment, the laser 101 and laser controller 189 can be included to make up a laser rangefinder.

A haptic controller 187 is also provided in the interactive smart tool 100 to interface with a haptic motor 194. The haptic motor 194 may be provided within a handle of the tool and may be configured to provide a vibratory alert to the user of the tool under certain conditions. For example, if a torque value of a chuck of the tool surpasses a safe level for drilling, a vibratory alert may be provided to the tool operator. In addition, if the tool operator is operating the interactive smart tool 100 at a height, for instance, at which the display 185 cannot be viewed, a vibratory alert can be provided when a prescribed depth of drilling has been reached.

A motor controller 196 may also be provided in the interactive smart tool 100 to interface with a motor 111. In an example, the motor controller 196 may implement field oriented control (FOC) and the motor 111 may be an induction motor, though other combinations of motor controller 196 and motor 111 may be used without deviating from the spirit of the invention. For instance, the motor 111 may be an AC synchronous motor and may be either brushed or brushless, while the motor controller 196 may be a servo motor controller, a stepper motor controller, and the like. FOC has precision torque capabilities that can be calculated directly from the motor rotation, rather than from an external strain gauge or other system to measure the output torque.

The general purpose storage controller 192 connects the storage medium disk 182 with communication bus 193, which may be an ISA, EISA, VESA, PCI, or similar, for interconnecting all of the components of the interactive smart tool 100. A description of the general features and functionality of the display 185 as well as the display controller 184, storage controller 192, network controller 183, sound controller 190, laser controller 189, haptic controller 187, and general purpose I/O interface 186 is omitted herein for brevity as these features are known.

Figure 2:
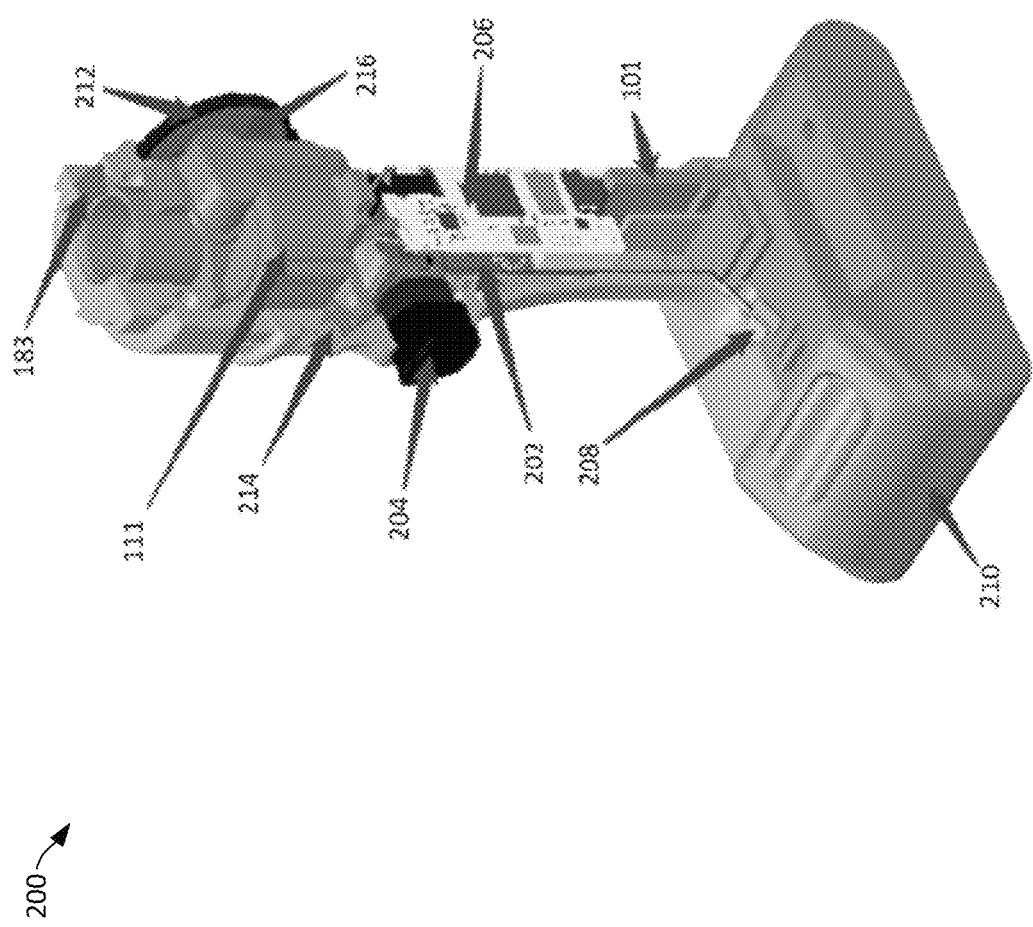
FIG. 2 is an illustration of a modular tool as an interactive smart tool, according to an exemplary embodiment of the present disclosure.

FIG. 2 shows one embodiment for a modular version of an interactive smart tool 200 related to that as described in FIG. 1. In one exemplary aspect, the interactive smart tool 200 can include a network controller 183, touch display 212, motor 111, camera 214, screen printed circuit board (PCB) 216, trigger 204, main PCB 206, power PCB 202, laser 101, flashlight 208, and battery 210. Additionally, any of the components mentioned in FIG. 1 for the interactive smart tool 100 can be incorporated into this interactive smart tool 200.

The main PCB 206 can include various circuitry and hardware as mentioned in FIG. 1, such as the speakers/microphone 191, sound controller 190, laser controller 189, motor controller 196, storage controller 192, disk 182, bus 193, memory 181, CPU 180, I/O interface 186, haptic controller 187, and haptic motor 194. Recall that the I/O interface 186 may be configured to be a special purpose I/O interface for communication with and control of one or more peripheral features, such as various sensors, lights, cameras, and so forth.

The flashlight 208 can be attached onto the interactive smart tool 200 and be used for emitting light in various colors or patterns. The camera 214 can also be attached onto the interactive smart tool 200 and be used for capturing images or video. As an example, the image can be of a barcode or QR code. The flashlight 208 and camera 214 can exchange data with the main PCB 206 via the I/O interface 186, according to one exemplary aspect.

In one embodiment, the battery 210 can provide power to various components of the interactive smart tool 200. Various types of batteries can be used, including but not limited to lithium, silver oxide, zinc carbon, alkaline manganese dioxide, and lithium iron disulfide batteries. In one embodiment, the battery can be connected to the power PCB 202. In one embodiment, the battery can be rechargeable. In another embodiment, the battery can we wirelessly charged. In another embodiment, the battery 210 can be omitted and the interactive smart tool 200 may receive power from an alternate power source, such as via a wired connection to a power outlet.

The power PCB 202 can be used to control the delivery of power from a power source (e.g. battery 210) to various components of the interactive smart tool 200, such as the main PCB 206 and additional components connected thereof. Obviously, various power designs and components can be implemented onto the power PCB 202 as can be appreciated by those of ordinary skill in the power supply design industry, such voltage convertors, filters, current sensors, regulators, and so on.

The trigger 204 can act as a switch to control power on and power off for various components in the interactive smart tool 200. For example, when the trigger 204 is pressed down (power on), power from the battery 210 can flow from the battery 210, through the power PCB 202, and into the main PCB 206, where the various components on and connected to the main PCB 206 can then be turned on.

In one embodiment, the touch display 212 can include the display 185 and touch screen 188, and may be positioned in a way that can allow a user to easily view and interact with the touch display 212. In one embodiment, the touch display 212 is round and has a diameter of 1.2 to 2 inches. In another embodiment, the size of the touch display 212 is fit in a form factor and does not exceed the outer dimensions of the body of the interactive smart tool 200. The screen PCB 216, which can include display controller 184, may be connected to the main PCB 206 and touch display 212, and may be configured to control the touch display 212. The touch display 212 can receive user input through touch, as well as display an output to a user. In one exemplary embodiment, the touch display 212 can be connected to the body of the interactive smart tool 200 via a swivel, which can enable a user to reorient the viewing angle of the touch display 212 for any particular application.

The laser 101 can be connected to the laser controller 189 on the main PCB 206 and make up a laser rangefinder for measuring distance between the interactive smart tool 200 and an object. In another embodiment, other distance sensors can be used, such as an infrared light (IR) sensor or ultrasonic sensor.

The touch display 212 can allow a user to interact with a range of other components housed by the interactive smart tool 200, such as the motor 111, laser 101, or network controller 183. A user can input commands via the touch display 212 to turn on, turn off, or configure specific settings onto various components of the interactive smart tool 200.

Figure 3:
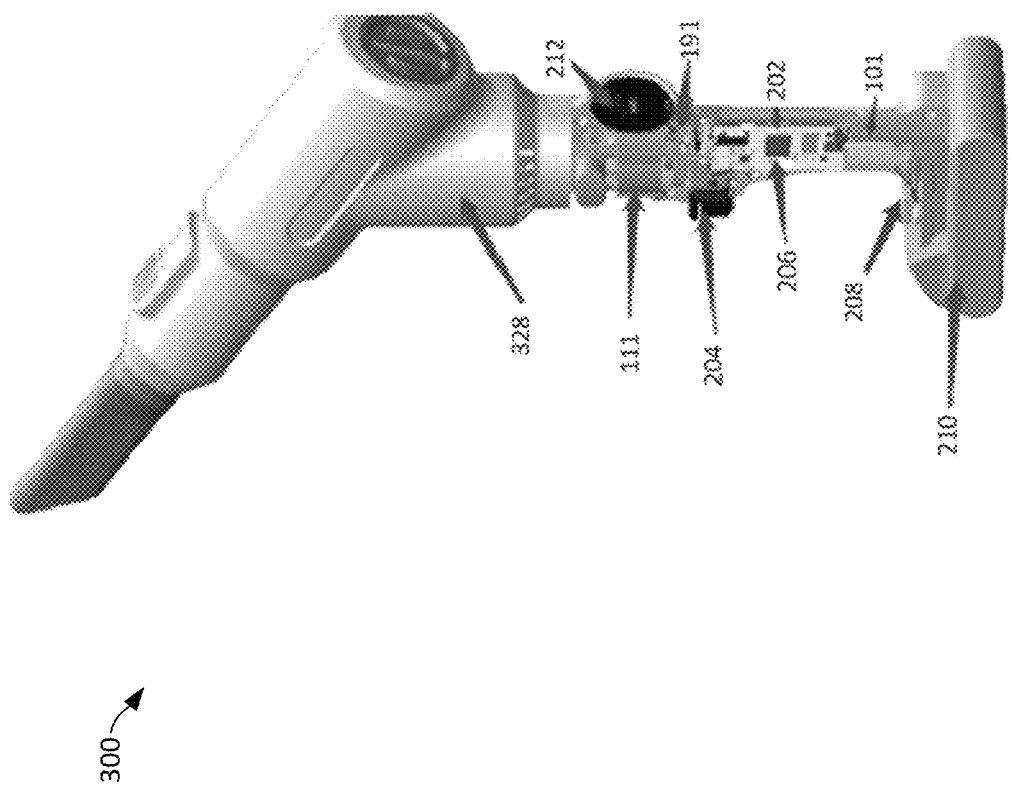
FIG. 3 is an illustration of a modular tool with a vacuum attachment as an interactive smart tool, according to an exemplary embodiment of the present disclosure.

The interactive smart tool 200 can be configured with an attachment, or an end effector. For example, FIG. 3 shows one embodiment of an interactive smart tool 300 related to those mentioned in FIG. 1 and FIG. 2. Here, the interactive smart tool 300 is created by attaching a vacuum head 328 onto the interactive smart tool 200 from FIG. 2. The vacuum head 328 can include a fan and be connected to the motor 111, the fan rotating as the motor 111 spins. In one embodiment, when an attachment is attached onto the interactive smart tool 200, such as the vacuum head 328, the touch display 212 can switch from displaying a default menu to displaying a custom menu with control options related specifically for the end effector, for example fan speed and direction if the end effector is a vacuum head 328.

Figure 4:
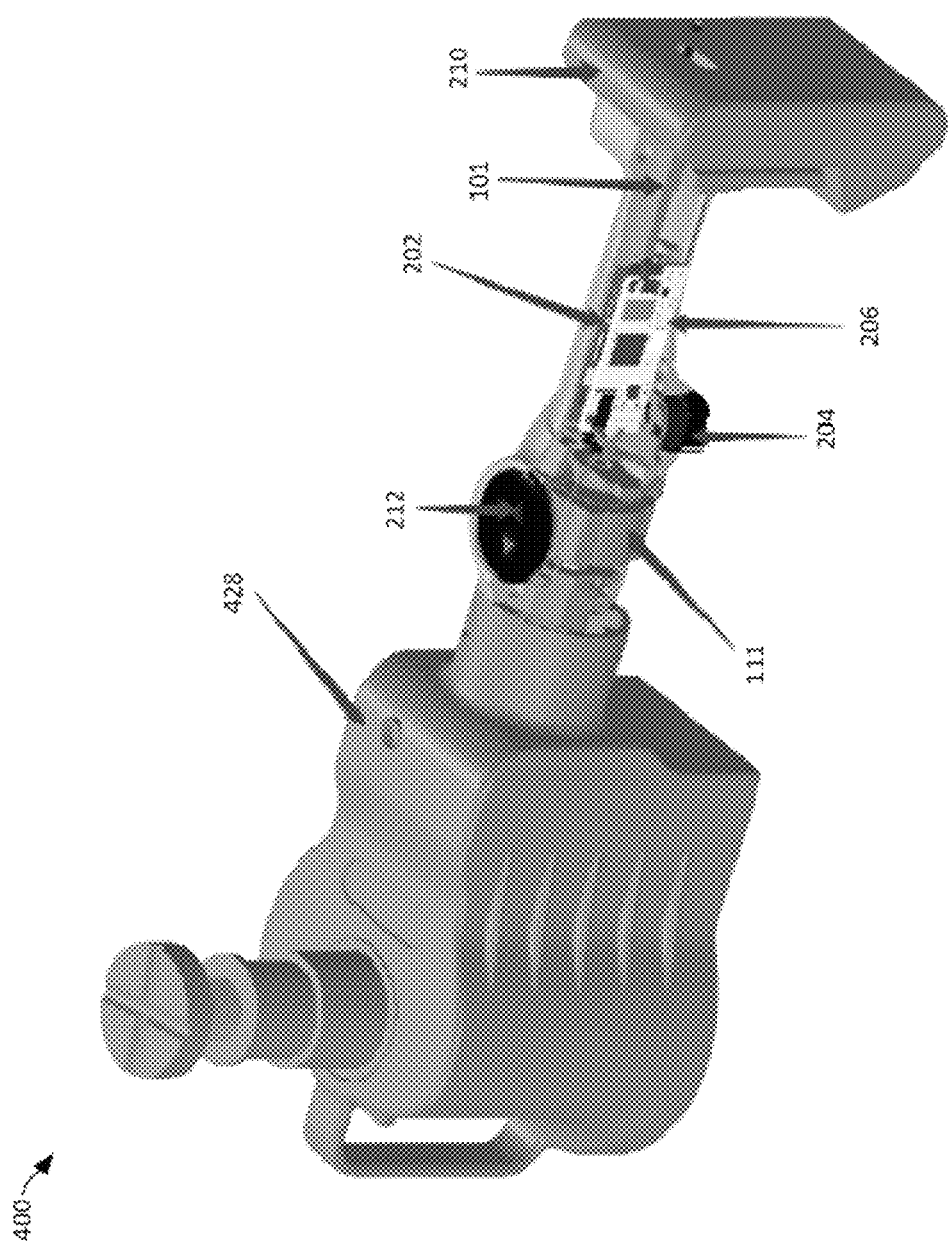
FIG. 4 is an illustration of a modular tool with a carjack attachment as an interactive smart tool, according to an exemplary embodiment of the present disclosure.

As another example of an end effector, FIG. 4 shows one embodiment of an interactive smart tool 400 related to those mentioned in FIG. 1 and FIG. 2. Here, the interactive smart tool 400 is created by attaching a carjack 428 onto the modular interactive smart tool 200 from FIG. 2. The carjack 428 can be used for lifting objects and may be connected to the motor 111. When the carjack 428 is attached to the interactive smart tool 200, the touch display 212 can automatically switch from displaying a default menu to displaying a custom menu with additional control options related specifically to using the carjack 428, such as a target lift height.

Figure 5:
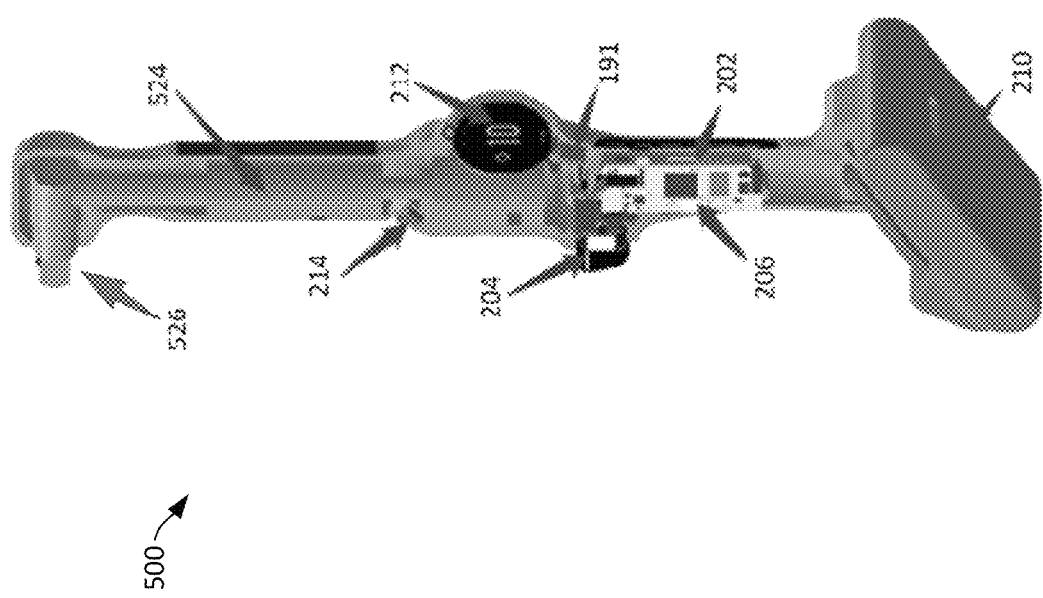
FIG. 5 is an illustration of a torque wrench as an interactive smart tool, according to an exemplary embodiment of the present disclosure.

FIG. 5 shows another example of an interactive smart tool 500 related to those mentioned in FIG. 1 and FIG. 2 with an end effector. Here, the interactive smart tool 500 can be created by attaching a gearbox 524 and torque wrench 526 onto the modular interactive smart tool 200 from FIG. 2. A first end of the gearbox 524 can be connected to the motor 111 and a second end of the gearbox 524 can be connected to the torque wrench 526. The torque wrench 526 can be used for applying torque to a fastener, such as a nut or bolt. The gearbox 524 can be set with a gearbox ratio and may be used for transferring torque between the motor 111 and the torque wrench 526. When the gearbox 524 or torque wrench 526 is attached to the interactive smart tool 200, the touch display 212 can automatically switch from displaying a default menu to displaying a custom menu with additional control options related specifically to using the gearbox 524 or torque wrench 526, such as a target torque.

Figure 6:
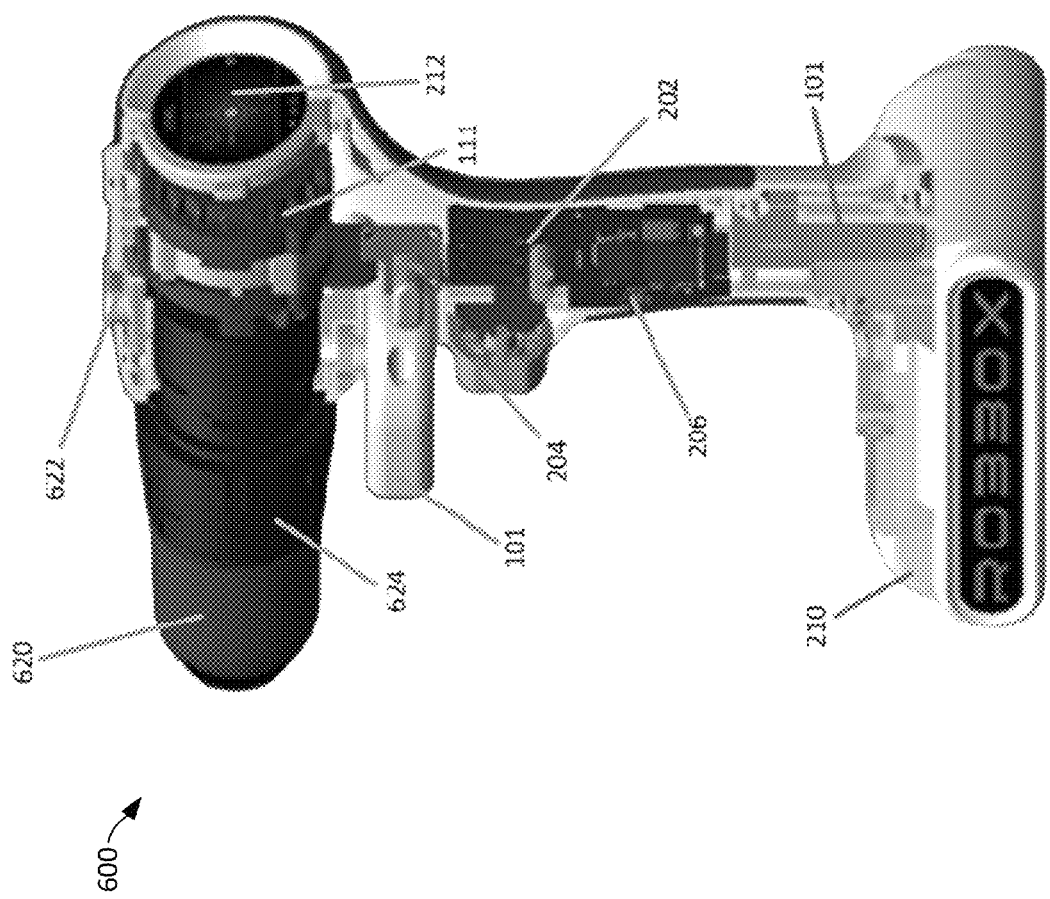
FIG. 6 is an illustration of a power drill as an interactive smart tool, according to an exemplary embodiment of the present disclosure.

FIG. 6 shows another example of an interactive smart tool 600. The interactive smart tool 600 can be created by attaching a chuck 620, gearbox 624, and torque switch 622 onto a variation of the modulated interactive smart tool 200 from FIG. 2, one main variation being an additional laser 101 that can be used for laser-guided drilling. A first end of the gearbox 624 can be connected to the motor 111 and a second end of the gearbox 624 can be connected to the chuck 620. The chuck 620 can be adjustable and used for firmly grasping objects, such as a drill bit. The gearbox 624 can be set with a gearbox ratio and may be used for transferring torque between the motor 111 and the chuck 620. The torque switch 622 can be connected to the main PCB 206 and motor 111, and can turn the motor 111 off when the torque exceeds a predetermined threshold. When the gearbox 624 or chuck 620 is attached to the interactive smart tool 200, the touch display 212 can automatically switch from displaying a default menu to displaying a custom menu with additional control options related specifically to the gearbox 624 or chuck 620, such as a drill bit size or clutch settings.

As illustrated by the preceding figures, it can be appreciated that a variety of arrangements of internal components can be imagined to create any of interactive smart tool 100, 200, 300, 400, 500, 600. The components can be housed within a body, thereby minimizing the form factor. The usage of the touch display 212 allows for the omission of all or some physical buttons for controlling the various components of the interactive smart tool 100, 200, 300, 400, 500, 600, which can streamline its usage. The body can also be used to prevent the internal components from water damage, shock damage, fall damage, et cetera. Further, it can be appreciated that many other end effectors may be used, such as a saw, sander, brush, and so on.

Now a description will be given on some of the various ways a user can interact with any of interactive smart tool 100, 200, 300, 400, 500 or 600 via the touch display 212. In one aspect, the touch display 212 can be used to receive an input from a user through touch, as well as to display an output to a user. The touch display 212 can allow a user to exchange data with the various components in the interactive smart tool 100, 200, 300, 400, 500, 600.

Figure 7A:
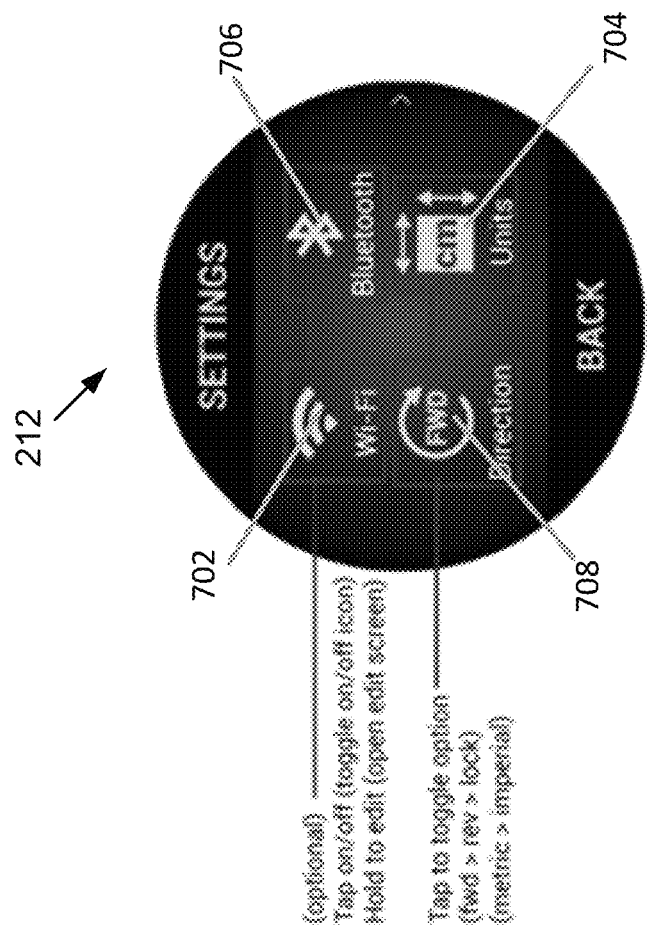
FIG. 7A is an illustration of a setting selection screen, according to an exemplary embodiment of the present disclosure.

In one aspect, as shown in FIG. 7A, a Wi-Fi icon 702, Bluetooth icon 706, direction icon 708, and units icon 704 can be shown on a setting page on the touch display 212. Tapping the Wi-Fi icon 702 or Bluetooth icon 706 can turn Wi-Fi or Bluetooth on or off, while holding either icon can open additional settings, such as entering a Wi-Fi password or selecting a Bluetooth device to connect to. Tapping the direction icon 708 can toggle between configuring the motor 111 to rotate clockwise or rotate counterclockwise. Tapping the units icon 704 can toggle between displaying units in metric or imperial. Of course, many other icon-types can exist, such as a flashlight icon, clock icon, laser rangefinder icon, temperature icon, camera icon, app store icon, e-commerce icon, microphone icon, speaker icon, and so on.

Figure 7B:
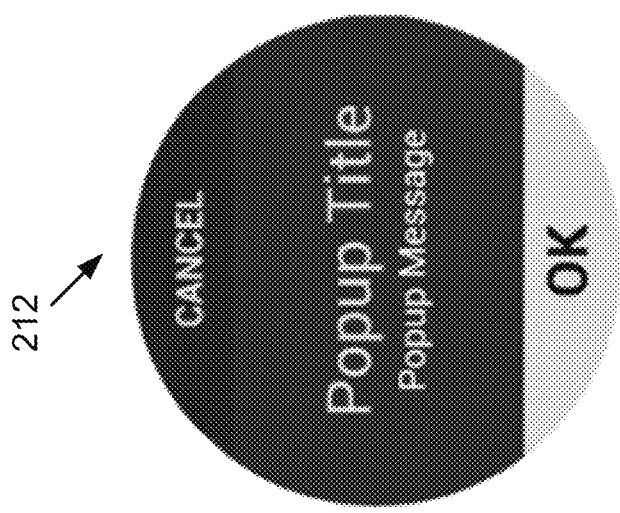
FIG. 7B is an illustration of a generic popup screen, according to an exemplary embodiment of the present disclosure.

In another exemplary aspect, the touch display 212 can display notifications, such as displaying text and image notifications to a user. An example of a notification is shown in FIG. 7B, where a popup title and popup message can be displayed to a user. The user can tap the touch display 212 to close the popup notification.

Further, the touch display 212 can be used to read and write various files into the memory 181. For example, a user can manage, delete, rename, move, or store files in the memory 181 using the touch display 212.

In another aspect, the user can control the speakers/microphone 191 to turn on or off, be set to a specific volume, mute or unmute, and more using the touch display 212. Further, the touch display 212 can be used to display various setting of the speakers/microphone 191 back to the user, such as the current volume, muted or unmuted status, and more.

As another example, the user can control the gearbox 524, 624. Using the touch display 212, the user can select a gearbox ratio. Further, the touch display 212 can be used to display the currently selected gearbox ratio.

In another example, the touch display 212 can allow a user to control the haptic motor 194, such as turning on or off haptic feedback or turning up or turning down vibration power. These setting can then be displayed back to the user via the touch display 212.

In another example, the touch display 212 can be used to control a laser rangefinder. Using the touch display 212, the user can turn on or turn off the laser rangefinder, input user measurement values, set measurement offsets, or change measurement units. In addition, the touch display 212 can display laser rangefinder measurements and alert the user when target measurements have been hit. Multiple laser rangefinders can be implemented for taking measurements at different angles from the interactive smart tool 100, 200, 300, 400, 500, 600. This can enable measuring the distance from the interactive smart tool 100, 200, 300, 400, 500, 600 to multiple different locations. For example, a forward facing laser rangefinder and a backward facing laser rangefinder can work in tandem to find a center location.

In another example, the touch display 212 can be used to control accelerometers, gyroscopes, or magnetometers. A user can select angle display options, select display modes, set a new reference axis, and input measurement angles. In return, the touch display 212 can display orientation of the interactive smart tool 100, 200, 300, 400, 500, 600.

In another example, the touch display 212 can control the motor controller 196. The touch display 212 can allow a user to select a maximum torque value, maximum motor 111 speed, motor 111 rotation direction, enable or disable the motor 111, and more. In return, the touch display 212 can display the current motor 111 torque, current motor 111 speed, current motor 111 rotation direction, and more back to the user.

In another example, the touch display 212 can be used to disable or enable lower power mode. Enabling lower power mode can include forcing one or more components into drawing less power (e.g. sleep mode). Further, the touch display 212 can display the battery 210 power level, estimated remaining battery 210 life, the rate of power consumption, and more back to the user.

In another example, the touch display 212 can be used to control a temperature sensor. For instance, a user can calibrate the temperature sensor to display the temperature in Fahrenheit versus Celsius, or to trigger an alert via the touch display 212, haptic motor 194, or speakers/microphone 191 when the temperature leaves a specified range. Additionally, the temperature readings can be displayed on the touch display 212. Further, the touch display 212 can be used to control a humidity sensor. Like the temperature sensor, a user can calibrate the humidity sensor to display the humidity in a specified unit, or to trigger an alert via the touch display 212, haptic motor 194, or speakers/microphone 191 when the humidity leaves a specified range. The humidity readings can also be displayed back to the user using the touch display 212. It can be appreciated that other sensors can be added in alternate configurations, such as a gas sensor or motion sensor.

In another example, the touch display 212 can control an image sensor, such as the camera 214. For instance, the user can control the camera 214 to capture an image by pressing a screen element, increase/decrease zoom by pressing a screen element or swiping, scan a bar code, scan a quick response (QR) code, scan a router to collect access point passwords, record a user performing task, and more. The touch display 212 can also display information back to the user, such as displaying information collected from a scanned bar code, a captured image, a captured video, and more. In one embodiment, the camera 214 can have thermal imaging capability.

In another example, the touch display 212 can control a stud finder. The user can use the touch display 212 to turn on or turn off the stud finder, to calibrate the stud finder to different surfaces, and more. The touch display 212, haptic motor 194, or speakers/microphone 191 can display an indication back to the user when a stud is found.

In another example, the touch display 212 can be used to control the network controller 183. The touch display 212 can allow a user to accept or reject software updates, select access points for Wi-Fi connections, input passwords for wireless connections using an alphanumeric keypad, enable or disable Wi-Fi connection, display text and images from remote sources, allow a user to enable or disable Bluetooth connection, select which Bluetooth device to pair with, input Bluetooth lower energy (BLE) security pin numbers, enable or disable a NFC antenna, display a NFC connection state, or display an indication to the user when data can be transferred over NFC. Additionally, the touch display 212 can allow a user to enable or disable global positioning system (GPS) positioning, and display GPS connection status and current GPS coordinates back to the user.

In one embodiment, the interactive smart tool 100 can connect to Internet-based servers to store collected data, as well as download data. The data transfers between the interactive smart tool 100 and the Internet-based servers can be in the form of text, images, video, sensor data, alerts, notifications, and the like.

In one embodiment, the touch display 212 can help facilitate e-commerce, where products on store catalogues can be displayed onto the touch display 212. A user can navigate through the different product offerings from various stores and purchase products. These products can be categorized in many ways, such as by product type or store.

In another embodiment, a user can download new applications for the interactive smart tool 100. The new applications can use existing sensors and components in unique ways to suit a user's specific work. The applications can also utilize other sensors and components (e.g. third party products) that are compatible with the interactive smart tool 100.

In one embodiment, artificial intelligence (AI) algorithms can be applied to data collected by the interactive smart tool 100, such as data collected by any of the components or user inputs. The data can be used by machine learning algorithms to predict how the interactive smart tool 100 is being used based off of previously collected data. Usage predication can be used to automate processes for optimization, tracking, and safety purposes.

Figure 8A:
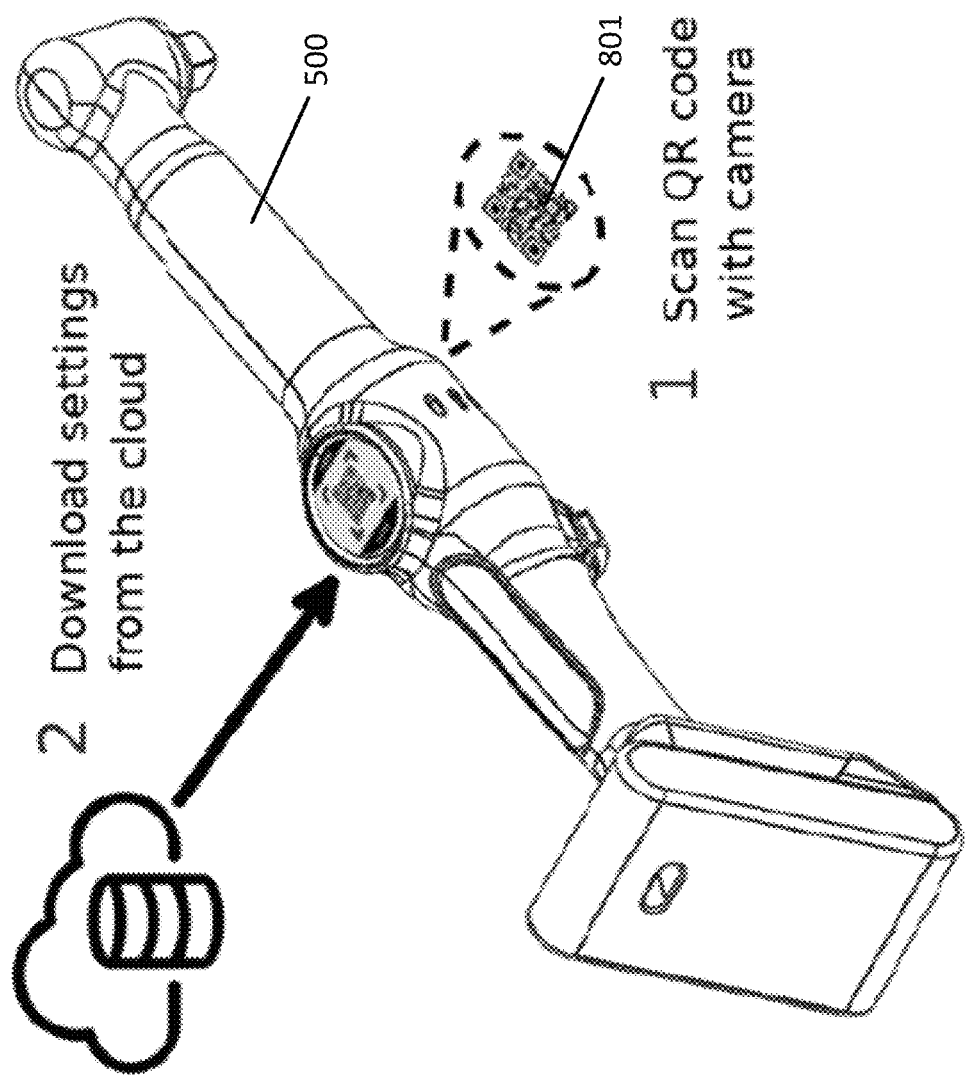
FIG. 8A describes a torque wrench scanning a QR code with a camera to download settings, according to an exemplary embodiment of the present disclosure.
Figure 8B:
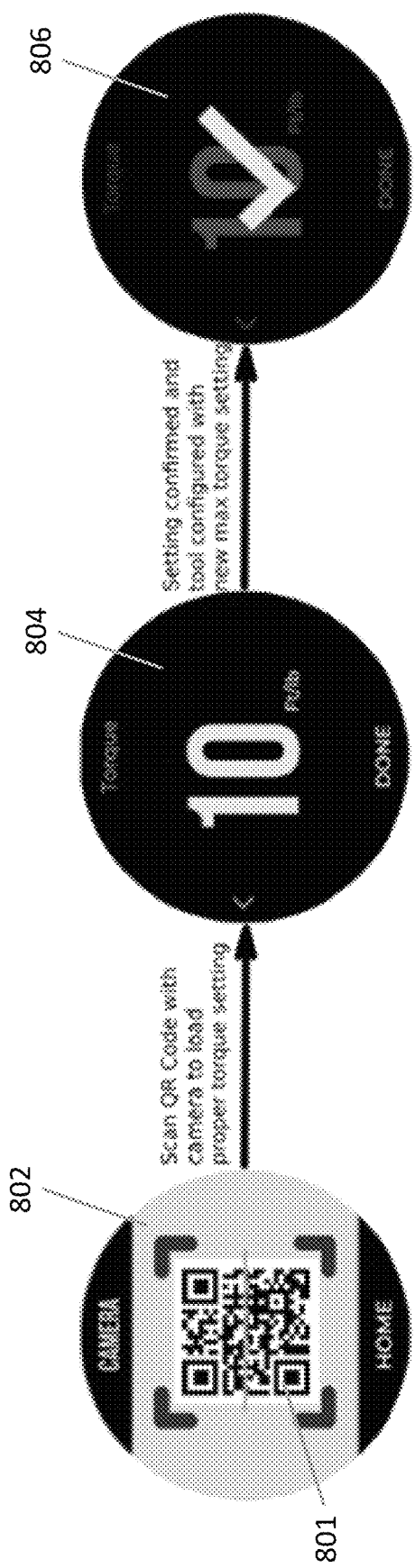
FIG. 8B describes screen transitions for scanning a QR code with a camera to download setting, according to an exemplary embodiment of the present disclosure.

As can be appreciated, there are many use cases and applications for the above mentioned tool. In one aspect, the network controller 183 can receive and download instructions (e.g. video tutorial) or configuration data from a network 105. The configuration data can be used to configure the settings of any one or more of the components in the interactive smart tool 100. For example, as shown in FIG. 8A, a user can first scan a QR code 801 (or any bar code) with a camera 214 integrated into an interactive smart tool 500 to receive configuration data. In this example, proper torque settings can be downloaded from a network 195 (e.g. a cloud remote server) and loaded into the interactive smart tool 500 automatically. The configuration data loaded into the interactive smart tool 500 can then be used to automatically configure the torque settings. FIG. 8B shows an example of how the touch display 212 can transition throughout this configuration process. The QR code 801 can be scanned with the camera 214, as shown by the first image 802. The proper torque settings can then be loaded and automatically configured onto the interactive smart tool 500, as shown by the second image 804. Finally, the user can be notified when the configuration has been completed, as shown by the third image 806. In certain instances, such a process can enable a tool to be configured much more efficiently compared to a user inputting every setting by hand via the touch display 212.

Figure 8C:
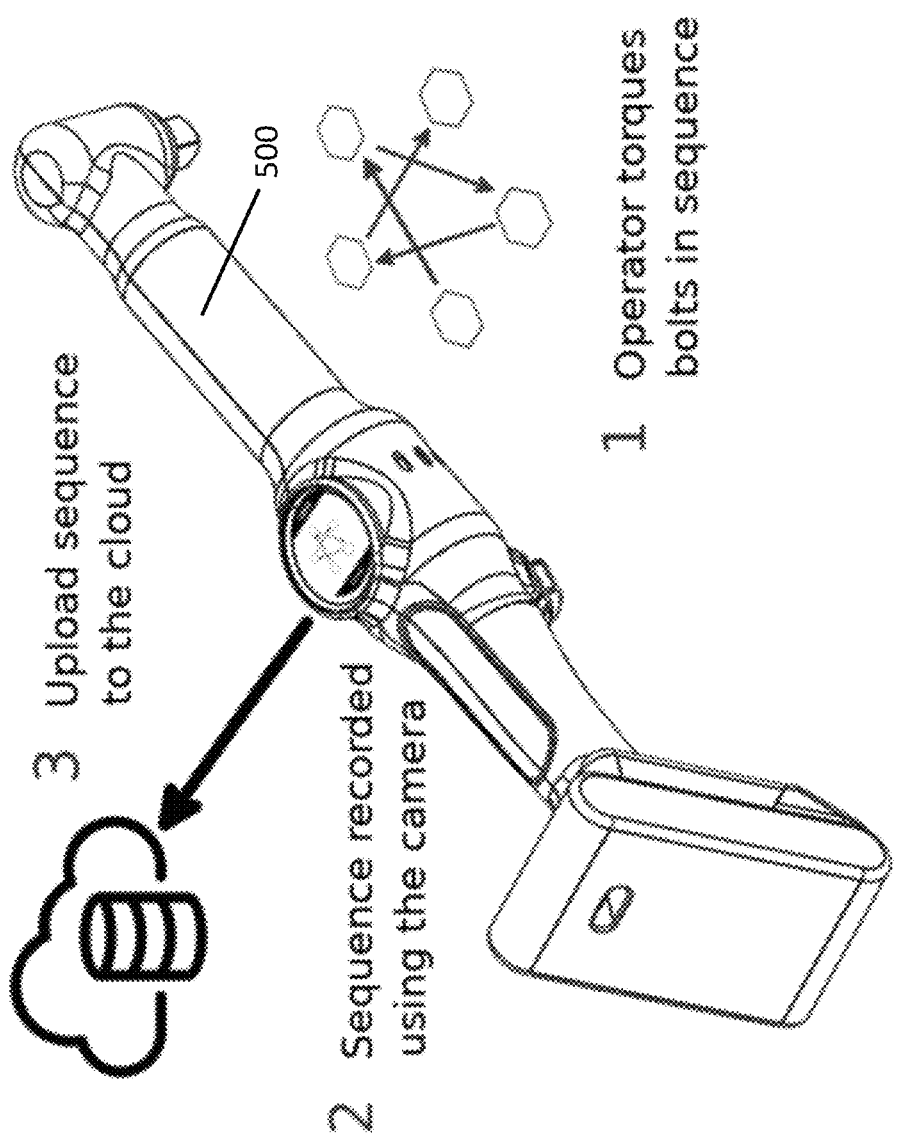
FIG. 8C describes process recording with a camera, according to an exemplary embodiment of the present disclosure.

In another embodiment, the camera 214 can allow the interactive smart tool 100, 200, 300, 400, 500, 600 to track an operator's progress through a predefined process, such as torqueing bolts in a specific sequence. This form of process tracking can provide valuable traceability information for quality assurance and can be uploaded to the network 195 for analysis and work records. FIG. 8C demonstrates how the camera 214 can be used to capture and store a work sequence for later use. In the example, the operator uses an interactive smart tool 500 to torque bolts in a given sequence. The sequence is recorded using the camera 214, and the network controller 183 (e.g. Wi-Fi or Bluetooth) can be used to upload the recorded sequence to the network 195 for later use. Once the process data is recorded and uploaded, a wide ride of post-processing options can be available. Machine Learning, Deep Learning and other AI algorithms can be applied to the data captured by the interactive smart tool 500. Applying AI tools to the process data can provide valuable information for process optimization and quality tracking predictions.

Figure 9A:
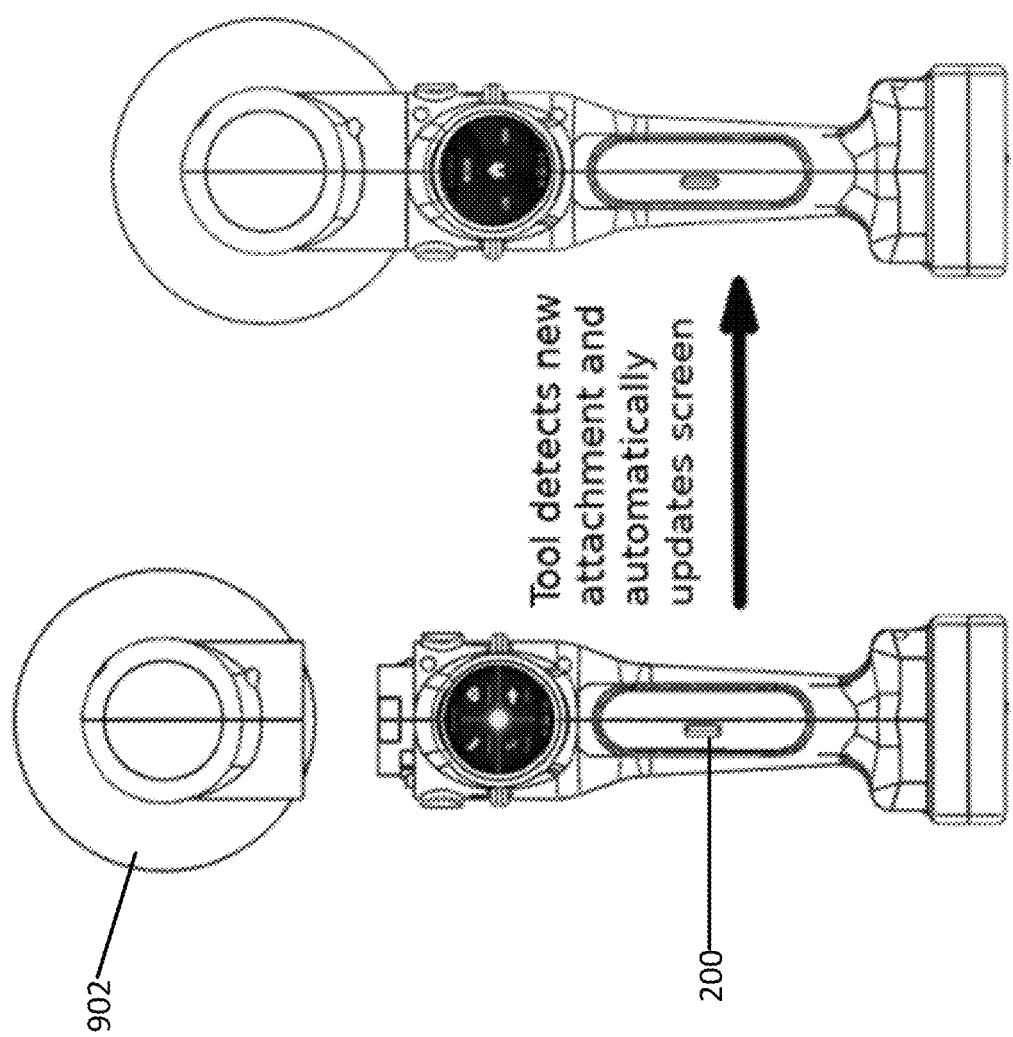
FIG. 9A describes detecting an attachment, according to an exemplary embodiment of the present disclosure.
Figure 9B:
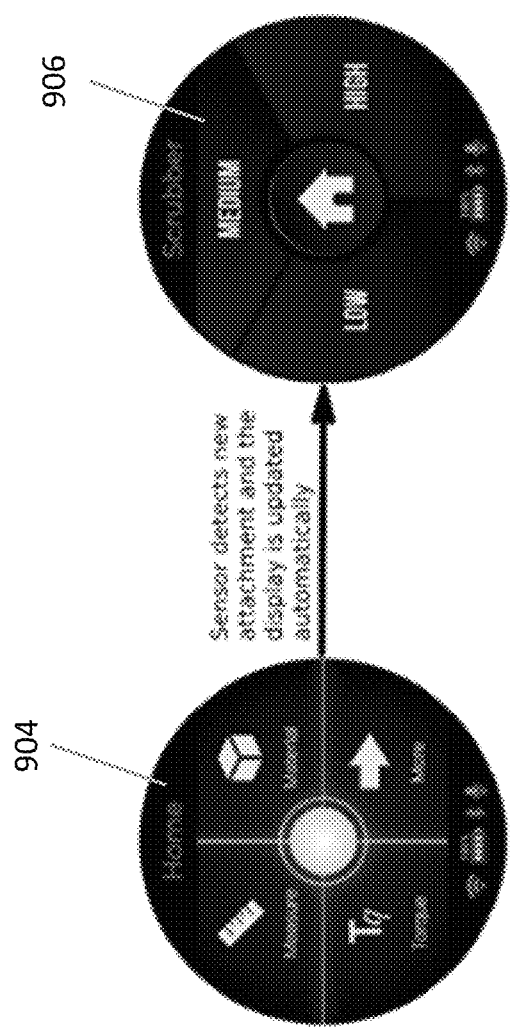
FIG. 9B describes screen transitions for detecting an attachment, according to an exemplary embodiment of the present disclosure.

After the attachment type has been identified, the various components of the interactive smart tool 200 can be automatically configured for the particular attachment type. In one exemplary embodiment, this can look like turning on certain components of the interactive smart tool 200 (e.g. motor 111, haptic motor 194) and turning off other components (e.g. laser 101, flashlight 208). Furthermore, the options available to a user on the touch display 212 can update based off the current configuration of the tool. The available options that show up on the touch display 212 can vary depending on the type of attachment that has been attached. For example, FIG. 9A demonstrates a scrubber 902 attachment being attached onto the interactive smart tool 200. When the scrubber 902 is detached the user can be presented with a default tool menu on the touch display 212 for performing any default actions. Once the scrubber 902 is attached, the various components can be configured accordingly. The touch display 212 can automatically update to reflect these new configurations by presenting the user with a new menu customized for the scrubber 902 application. FIG. 9B shows the touch display 212 that can be presented to the user before and after the scrubber 902 is attached. Before the scrubber 902 is attached, the touch display 212 can show a default tool menu 904. After the scrubber is attached, the touch display 212 can update automatically to show a customized menu 906 for the scrubber 902 configuration. Of course this is just one example of how a change in configuration can trigger automatic touch display 212 transitions. Display changes such as these can be incorporated with any combination of attachments incorporated in the interactive smart tool 200.

Figure 10A:
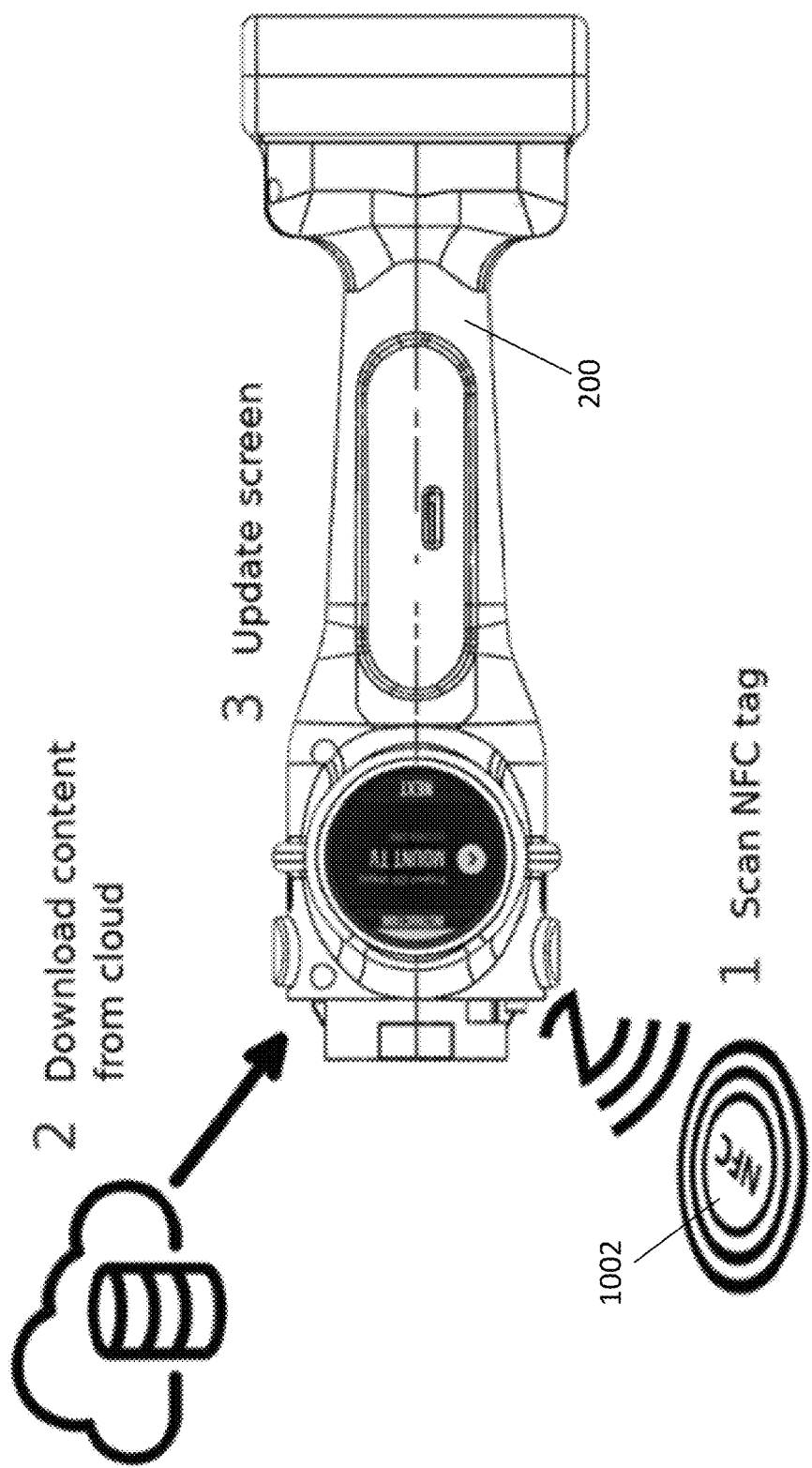
FIG. 10A describes scanning an NFC tag using an NFC reader to download a video tutorial from the cloud, according to an exemplary embodiment of the present disclosure.

In another embodiment, the user can use wireless communication to display information to a user via the touch display 212. FIG. 10A shows how a user can easily access data stored on a network 195 for viewing on their touch display 212. First, the user can scan an NFC tag 1002 associated with the information they want, which in this example are instructions on how to mount a TV. In this example, the information collected from the NFC tag 1002 can be used by the interactive smart tool 200 to access a remote cloud server and download the instruction content. Lastly, the touch display 212 can be automatically updated to show the user the new instruction content.

Figure 10B:
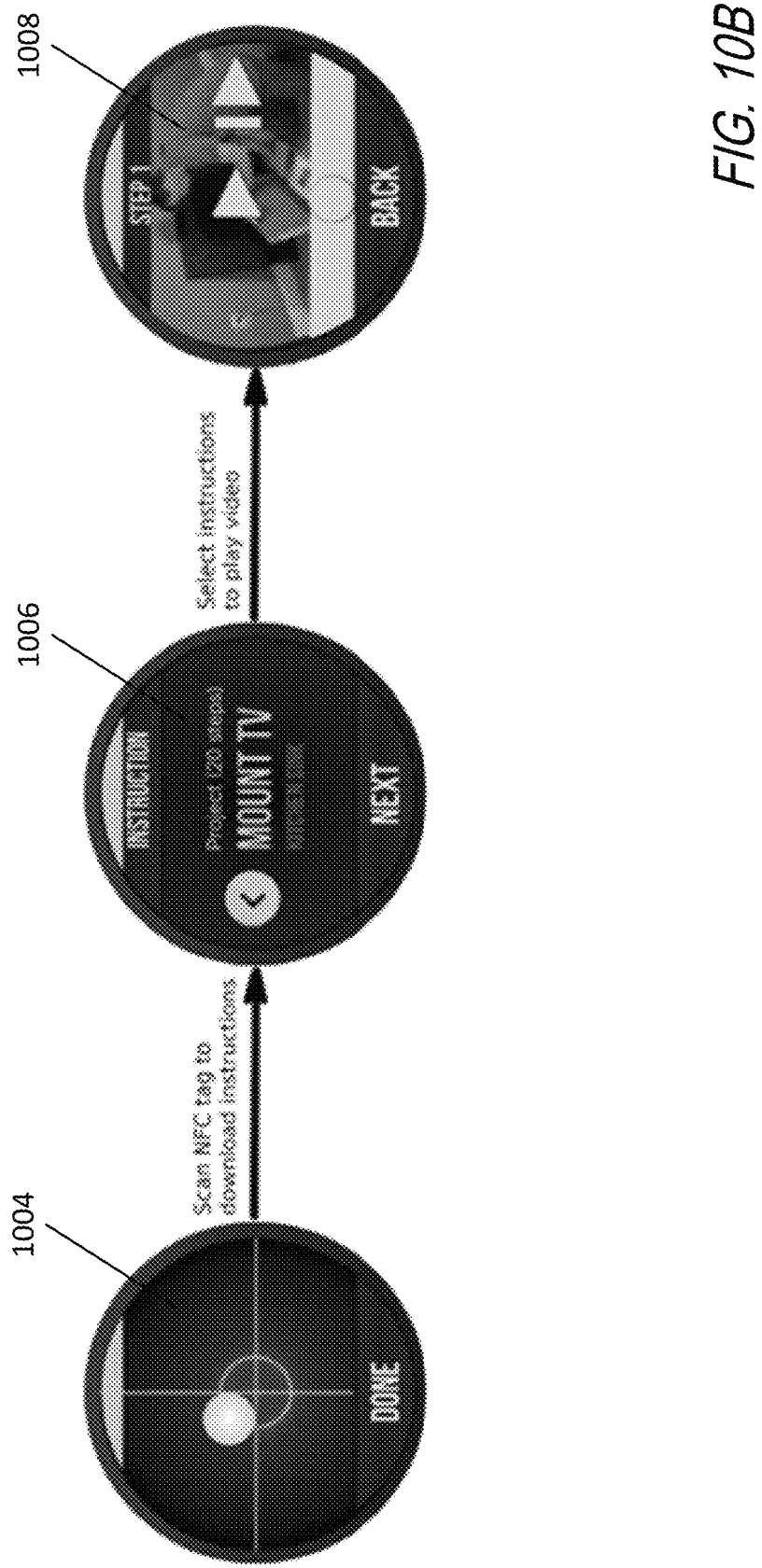
FIG. 10B describes screen transitions for downloading a video tutorial from the cloud, according to an exemplary embodiment of the present disclosure.
Figure 10C:
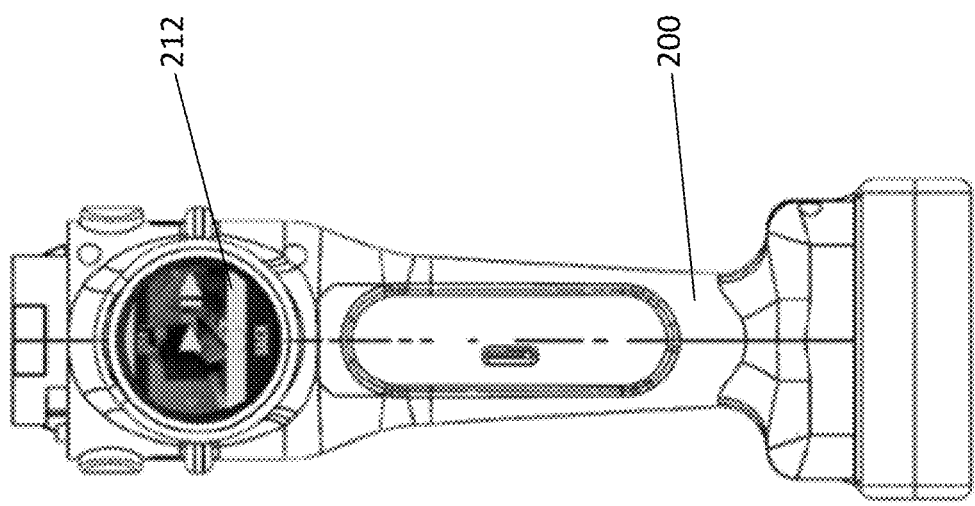
FIG. 10C describes video playback on a modular tool, according to an exemplary embodiment of the present disclosure.

FIG. 10B shows an example of touch display 212 transitions for the download process described in FIG. 10A. As shown by the first image 1004, a user can first scan the NFC tag 1002 to automatically retrieve content from the remote cloud server. The touch display 212 can then update to show a list of content available to the user. For instance, as shown in the second image 1006, the user can select the content on how to mount a TV. Finally, the touch display 212 can display the content, as shown in the third image 1008. If this video has sound, it can be played via the speakers/microphone 191. Further, the user can interact with the content once it is downloaded onto the interactive smart tool 200 (e.g. play, pause, fast forward, rewind, et cetera). FIG. 10C shows a perspective view of the content being displayed for a user on the touch display 212 of the interactive smart tool 200.

In another embodiment, a user can use the touch display 212 to configure application specific settings on their interactive smart tool 100, 200, 300, 400, 500, 600. This can include using the touch display 212 to receive user input for adjusting the direction of spin for the motor 111, enabling a laser rangefinder, adjusting torque, adjusting volume, adjusting touch display 212 brightness, setting up a timer, and the like.

Figure 11:
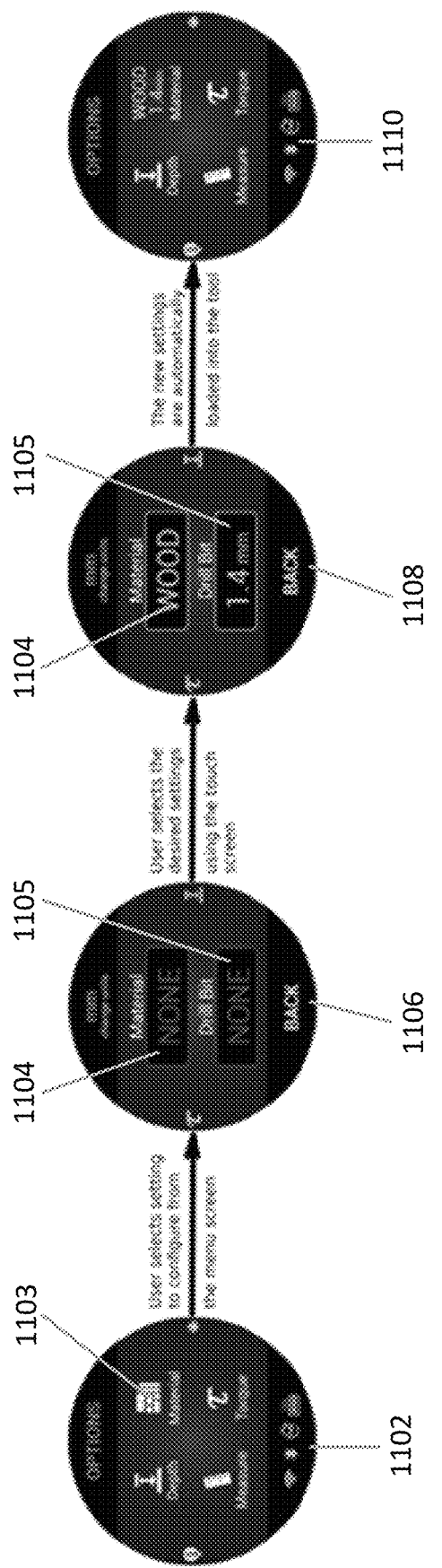
FIG. 11 describes screen transitions for laser assisted drilling, according to an exemplary embodiment of the present disclosure.

FIG. 11 outlines an example of touch display 212 transitions that can be presented to a user when they want to configure their interactive smart tool 600 for drilling wood using a 1.4 mm drill bit. In the beginning, the user can be presented with an option menu including a range of icons, as shown in the first image 1102. Next, the user can select the material icon 1103, where they are presented with a material input option 1104 and drill bit input option 1105, as shown in the second image 1106. The user can select wood for the material input option 1104 and 1.4 mm for the drill bit input option 1105, as shown by the third image 1108. Finally, the new setting can be automatically loaded into the interactive smart tool 600, as indicated in the fourth image 1110.

Figure 12A:
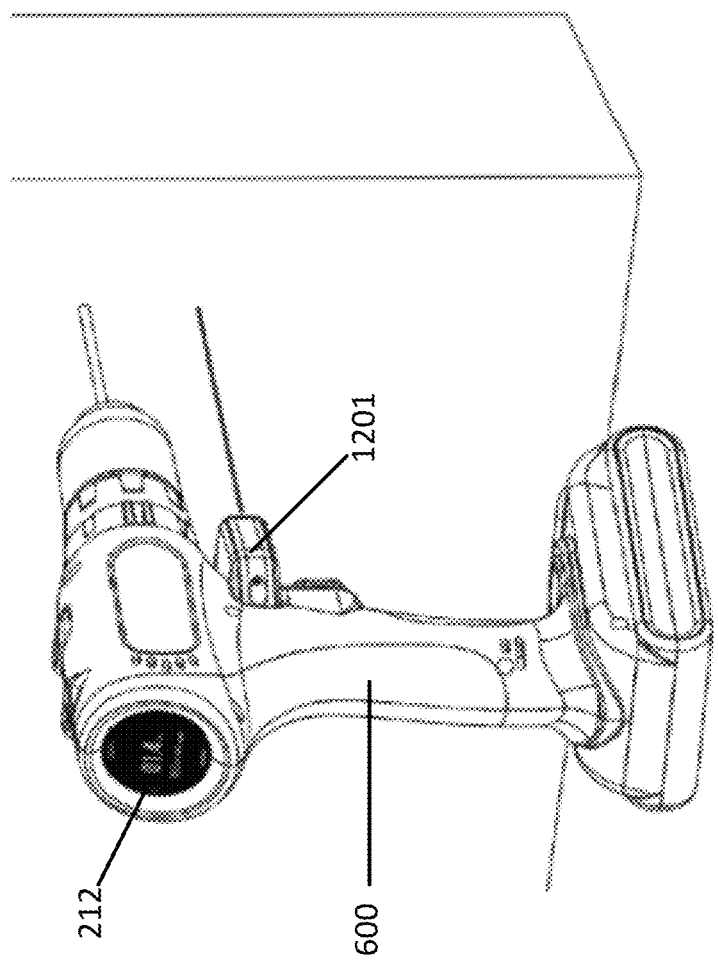
FIG. 12A describes laser assisted drilling, according to an exemplary embodiment of the present disclosure.
Figure 12B:
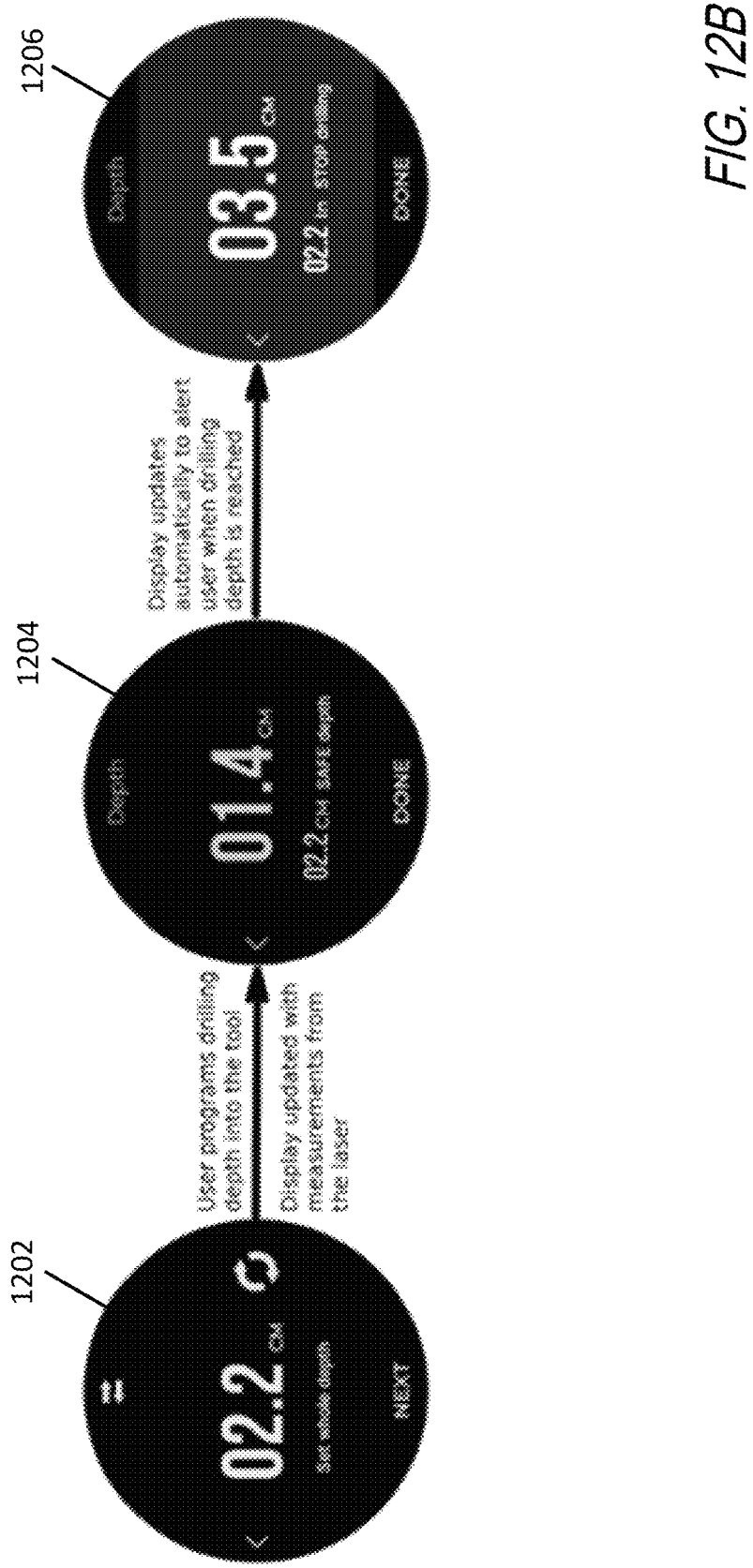
FIG. 12B describes screen transitions for laser assisted drilling, according to an exemplary embodiment of the present disclosure

In another embodiment, a user can also configure the interactive smart tool 100 to provide alerts for certain applications when an alert threshold has been overcome. A user can enter a predetermined alert threshold into the interactive smart tool 100 via the touch display 212, and an alert can be sent out when the alert threshold has been overcome. These alerts can be delivered in various ways, such as visually via the touch display 212, through vibration of the haptic motor 194, audibly via the speakers/microphone 191, or any combination thereof. For example, FIG. 12A shows how the interactive smart tool 600 can use a laser rangefinder 1201 to provide the user with feedback on hole depth while they are drilling. The laser rangefinder 1201 can take distance measurements as the user drills the hole. The measurements can be displayed on the touch display 212 to provide real-time feedback on the current hole depth. When it has been detected that the present drilling depth has been reached the user can be presented with an alert, or the interactive smart tool 600 can automatically stop drilling. FIG. 12B shows an example of how the touch display 212 can transition for this laser assisted drilling process. First, a user can input a desired hole depth, as shown in the first image 1202. The interactive smart tool 600 may be in contact with the wall, out of contact with the wall, or otherwise, and the desired hole depth can be provided to the interactive smart tool 600 via the touch display 212 or via another input method. As the interactive smart tool 600 is brought into close proximity to the wall (e.g. 2 in., 3 in., 4 in., or other predefined distance), the touch display 212 can switch to display the actual hole depth in real time as drilling occurs. Prior to contact with the wall, the touch display 212 may show a negative value or, in an example, may display a user input menu wherein a wall reference point may be set. In this example, and after having set the wall reference point via the touch display 212, the touch display 212 may, gain, be updated to reflect a hold depth, as in the second image 1204. Accordingly, the hole depth can be monitored in real time and the touch display 212 can alert the user when the desired hole depth has been reached, as shown by the third image 1206.

In another exemplary embodiment, laser rangefinders can be used to measure and locate particular distances. For example, if a user wants to drill a hole at a specific location on a wall (e.g. horizontal center, vertical center, 12 inches above the ground, 2 feet and 45 degrees to the northwest of a wall corner), a user can use the touch display 212 for navigating to and selecting such an option. Once selected, one or more different laser rangefinders can measure a distance between the interactive smart tool 600 and a wall/ground/ceiling. The touch display 212 can switch to display the various measured distances. As the user moves the interactive smart tool 600, the distances measured by the laser rangefinders can be displayed back to the user, allowing them to monitor distances in real time. Once the interactive smart tool 600 is at the correct location, it can signal an alert to the user.

In one exemplary embodiment, the interactive smart tool 100, 200, 300, 400, 500, 600 is capable of employing extended reality techniques, such as virtual reality, augmented reality, and mixed reality. For instance, additional digital elements can added onto a video captured by the camera 214 and be displayed back to a user via the touch display 212 in real time. In this example the touch display 212 could toggle off and on based on the status of the virtual reality headset or eyewear connected to the smart tool 100, 200, 300, 400, 500, 600 by a wireless connection. Furthermore, the touch display 212 interface could change based on the connection status of the virtual reality headset or eyewear or the position of the virtual reality headset or eyewear with respect to the smart tool 100, 200, 300, 400, 500, 600 in three dimensional space.

Figure 13:
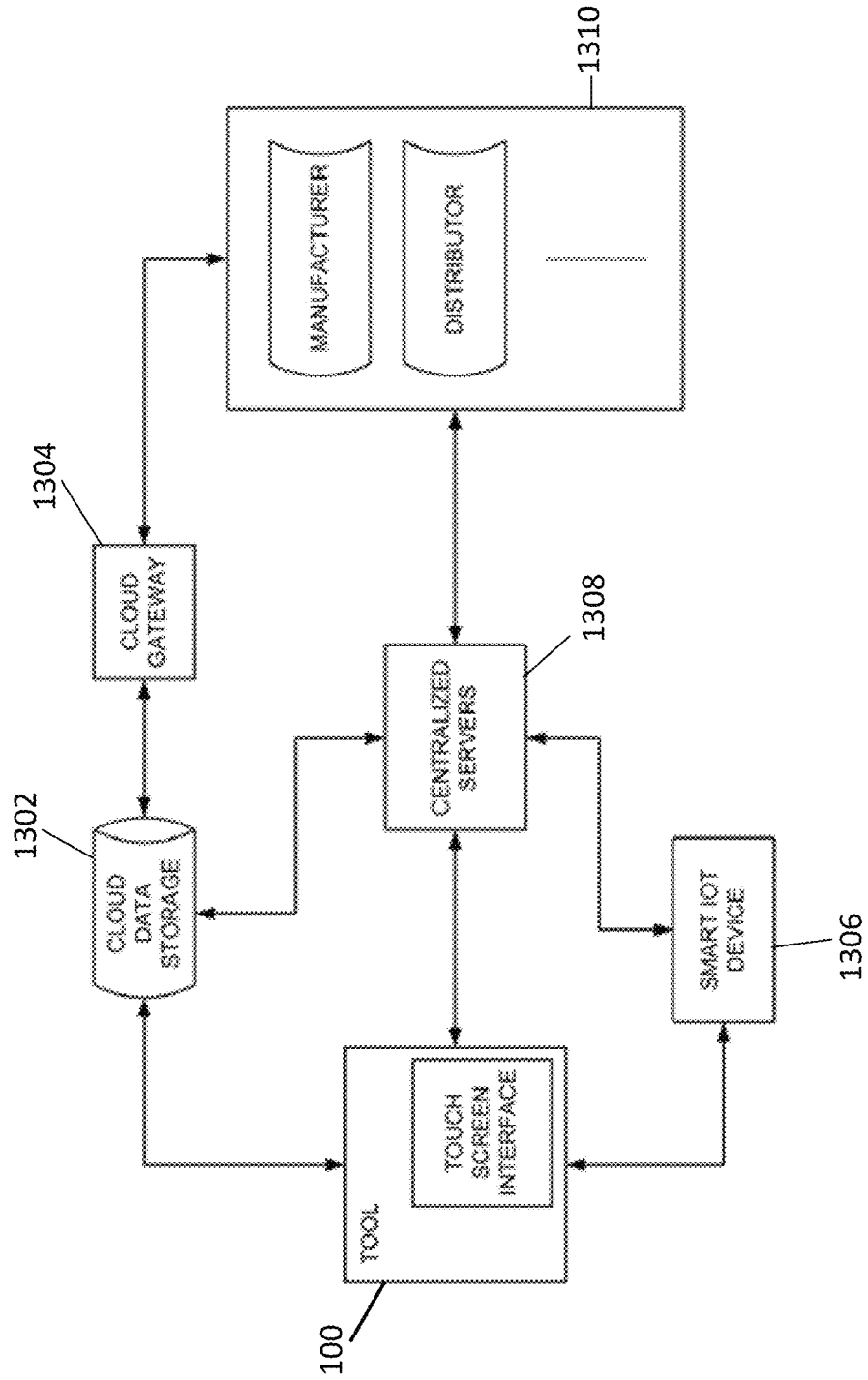
FIG. 13 is a schematic of data flow within an interactive smart tool, according to an exemplary embodiment of the present disclosure.

FIG. 13 provides a schematic of data flow within an interactive smart tool 100 according to one embodiment. The interactive smart tool 100 can exchange data with a manufacturer/distributor 1310, cloud data storage 1302, cloud gateway 1304, centralized servers 1308, smart internet of things (IOT) device 1306, or any combination thereof. In one aspect, the interactive smart tool 100 can transmit data related to the type of attachment connected, sensor data gather by any one or more of its various sensors (e.g. laser rangefinder, IMU, image sensor, NFC reader, et cetera), and tracked user data related to a user's inputs. In another aspect, the interactive smart tool 100 can receive data related to configuring their tool for a specific application, software updates, a video (e.g. a video tutorial) for performing a certain task, and the like. Of course, these are non-limiting examples, and a manufacturer/distributor can store any additional data on the cloud data storage 1302, centralized servers 1308, or smart IOT device 1306 for an interactive smart tool 100 to access and download.

Figure 14:
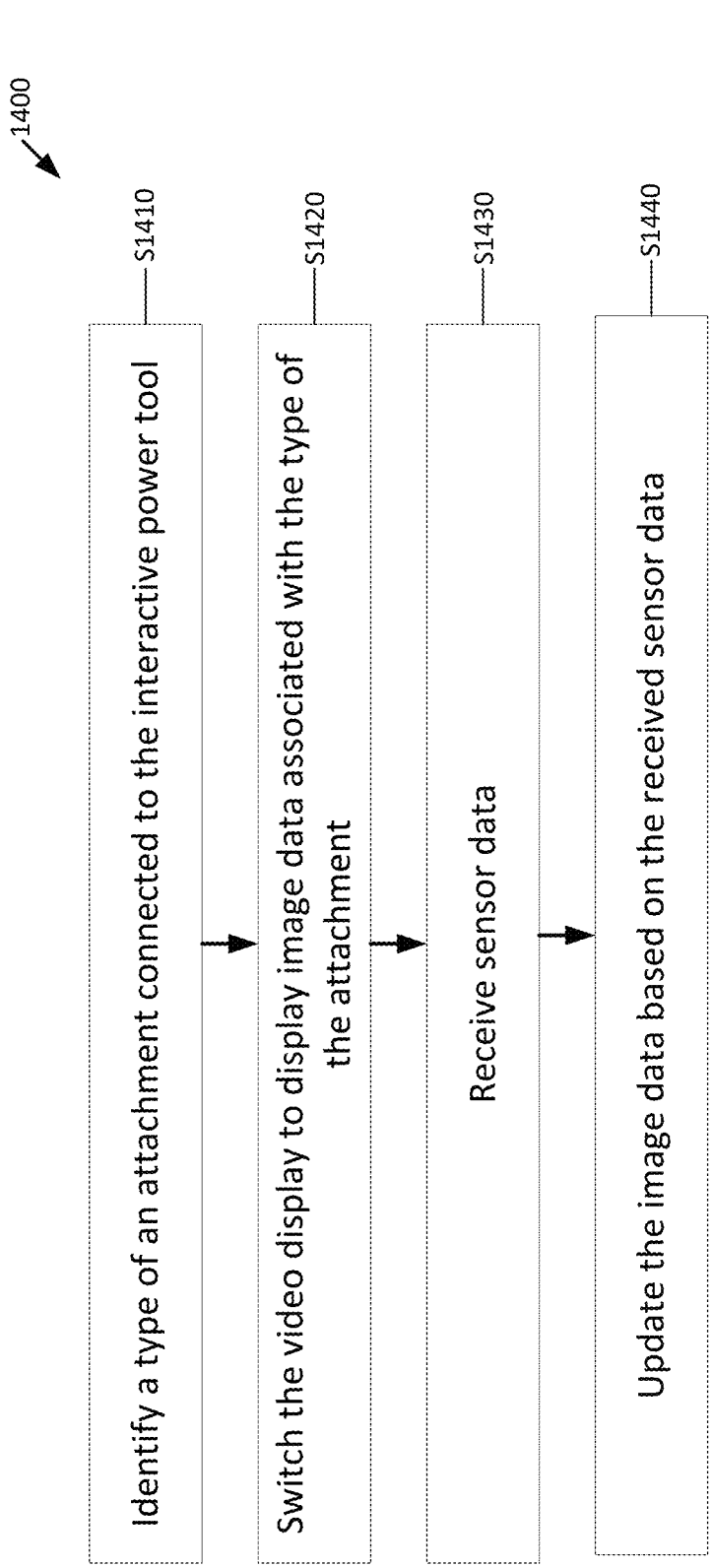
FIG. 14 is a flowchart of a method for configuring the interactive smart tool, according to an exemplary embodiment of the present disclosure.

FIG. 14 provides a method 1400 that can be performed by the CPU 180 according to one exemplary aspect of the present disclosure. The first step S1410 is to identify the type of attachment, such as whether the attachment is a chuck 620 or carjack 428. In one exemplary embodiment, after the attachment is identified, individual components within the interactive smart tool 100, 200, 300, 400, 500, 600 can be configured accordingly. This configuring can include turning on a component, turning off a component, or configuring a particular setting onto a component. For example, if the attachment is a torque wrench 526, the laser 101 and laser controller 189 can be turned off, the motor 111 and speakers/microphone 191 can be turned on, and the camera 214 can be configured to capture video. As another example, if the attachment is a chuck 620, the laser 101 and laser controller 189 can be turned on, and the gearbox 624 can be set to a specific torque range.

The next step S1420 is to switch the touch display 212 to display image data associated with the type of the attachment. The image data can include control options for controlling the attachment, as well as the other available components on the interactive smart tool 100, 200, 300, 400, 500, 600. For instance, if the attachments are a gearbox 624 and chuck 620, the touch display 212 can display additional control options to a user, such as selecting a drill bit size, gearbox ratio, or target hole depth.

The next step S1430 is to receive sensor data from one or more components within the interactive smart tool 100, 200, 300, 400, 500, 600. The individual components that have sensing capabilities, such as the camera 214, laser rangefinder, IMU, NFC reader, temperature sensor, humidity sensor, speakers/microphone 191, or touch display 212 can collect and distribute sensor data to the CPU 180. Further, this data can be used to trigger subsequent actions, such as turning an individual component on or off, or changing a setting on an individual component. For example, if the temperature sensor reads a temperature above a predetermined threshold, the laser rangefinder can be turned off and the haptic motor 194 can be turned on.

The next step S1440 is to update the image data based on the received sensor data. The sensor data can be displayed to a user via the touch display 212. The image data can include raw data collected by one or more sensors, or post-processed data collected by the sensors. If the sensor data triggered any actions, this can be displayed via the touch display 212 as well.

In one exemplary embodiment, the method 1400 further includes receiving configuration data. This configuration data can be used to automatically configure one or more of the components in the interactive smart tool 100, 200, 300, 400, 500, 600. In another exemplary embodiment, the method 1400 further includes receiving video data from an Internet-based server. This video data can be a video tutorial displayed to a user for performing a task. The configuration data and video data can be obtained from an Internet-based server through a variety of techniques, such as scanning a QR code, scanning an NFC tag, or through the use of touch on the video display 212.

In one exemplary embodiment, the updating at step S1440 can include real-time adjustments to the touch display 212 following instantiation of a functional activity.

In one exemplary embodiment, the method 1400 further includes transmitting sensor data to an Internet-based server. In another exemplary embodiment, the method 1400 further includes transmitting user input to an Internet-based server. The user input can include data on the controls selected by the user, as well as any other data related to the usage of the interactive smart tool 100, 200, 300, 400, 500, 600. The transmitted sensor and user input data can be analyzed by AI algorithms. In one aspect, this analyzing can determine process improvements, which can be sent back to the user.

The teachings of U.S. patent application Ser. No. 16/468,129 are hereby incorporated by reference in its entirety for all purposes.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An interactive power tool, comprising a power source, a video display mounted on a surface of a housing, the video display being integrated with a touch sensitive display, one or more sensors attached to the housing, and processing circuitry, within the housing and electrically coupled to the power source, configured to identify a type of attachment connected to the interactive power tool, dynamically switch the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool, receive sensor data from the one or more sensors, and update the image data based on the received sensor data from the one or more sensors.

(2) The interactive power tool according to (1), wherein the one or more sensors includes an image sensor.

(3) The interactive power tool according to either (1) or (2, wherein the one or more sensors includes a near field communication reader.

(4) The interactive power tool according to any one of (1) to (3), wherein the one or more sensors includes a laser rangefinder and an inertial measurement unit.

(5) The interactive power tool according to any one of (1) to (4) wherein the processing circuitry is further configured to update the image data by generating an alert to a user via the video display when an alert threshold has been overcome.

(6) The interactive power tool according to any one of (1) to (5), wherein the housing further houses a speaker and the processing circuitry is further configured to generate an audible alert to a user via the speaker when an alert threshold has been overcome.

(7) The interactive power tool according to any one of (1) to (6), wherein the housing further houses a haptic motor electrically-coupled to the power source and the processing circuitry is further configured to generate a vibratory alert to a user via the haptic motor when an alert threshold has been overcome.

(8) The interactive power tool according to any one of (1) to (7), further comprising a wireless communication module, wherein the processing circuitry is in wireless communication with an Internet-based server via the wireless communication module, the processing circuitry being further configured to transmit the type of the attachment to the Internet-based server, the type of the attachment being associated with a user application.

(9) The interactive power tool according to any one of (1) to (8), further comprising a wireless communication module, wherein the processing circuitry is in wireless communication with an Internet-based server via the wireless communication module, the processing circuitry being further configured to transmit the sensor data to the Internet-based server, wherein the Internet-based server analyzes the sensor data using artificial intelligence algorithms.

(10) The interactive power tool according to any one of (1) to (9), further comprising a wireless communication module, wherein the processing circuitry is in wireless communication with an Internet-based server via the wireless communication module, the processing circuitry being further configured to receive configuration data from the Internet-based server, and configure the interactive power tool according to the configuration data.

(11) The interactive power tool according to any one of (1) to (10), further comprising a wireless communication module, wherein the processing circuitry is in wireless communication with an Internet-based server via the wireless communication module, the processing circuitry being further configured to receive video data from the Internet-based server, and display the video data via the video display.

(12) The interactive power tool according to any one of (1) to (11), further comprising a wireless communication module, wherein the processing circuitry is in wireless communication with an Internet-based server via the wireless communication module, the processing circuitry being further configured to track received user input, and transmit the received user input to the Internet-based server, wherein the Internet-based server analyzes the user input using artificial intelligence algorithms.

(13) The interactive power tool according to any one of (1) to (12), further comprising a motor, within the housing, electrically-coupled to the power source and configured to control the attachment according to the processing circuitry using field oriented control.

(14) The interactive power tool according to any one of (1) to (13), wherein the attachment is associated with at least one of a torque wrench, a chuck, a vacuum, a carjack, and a scrubber.

(15) The interactive power tool according to any one of (1) to (14), wherein the video display has a diameter of between 1.2 inches to 2 inches.

(16) A method for configuring an interactive power tool, comprising identifying, by processing circuitry, a type of attachment connected to an interactive power tool including a power source, a video display mounted on a surface of a housing, the video display being integrated with a touch sensitive display, and one or more sensors attached to the housing, dynamically switching, by the processing circuitry, the video display to display image data associated with the type of attachment and to display selectable options actuatable via the touch sensitive display corresponding to functionality of the attachment in response to identification of the type of attachment connected to the interactive power tool, receiving, by the processing circuitry, sensor data from the one or more sensors, and updating, by the processing circuitry, the image data based on the received sensor data from the one or more sensors.

(17) The method of (16), further comprising generating, by the processing circuitry, an alert to a user when an alert threshold has been overcome.

(18) The method of either of (16) or (17), further comprising receiving, by the processing circuitry, at least one of configuration data and video data from an Internet-based server.

(19) The method of any one of (16) to (18), further comprising transmitting, by the processing circuitry, at least one of the sensor data and received user input to an Internet-based server.

(20) A non-transitory computer-readable storage medium storing computer-readable instructions that, when executed by a computer, cause the computer to perform a method for configuring a power tool, comprising identifying a type of attachment connected to an interactive power tool including a power source, a video display mounted on a surface of a housing, the video display being integrated with a touch sensitive display, and one or more sensors attached to the housing, dynamically switching the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool, receiving sensor data from the one or more sensors, and updating the image data based on the received sensor data from the one or more sensors.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A multifunction interactive power tool, comprising:
a power source;
a video display mounted on a surface of a housing, the video display being integrated with a touch sensitive display;
one or more sensors attached to the housing; and
processing circuitry, within the housing and electrically coupled to the power source, configured to
identify a type of attachment connected to the interactive power tool, the attachment being configured to accept any consumable compatible with the attachment;
dynamically switch the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool,
receive sensor data from the one or more sensors, and
update the image data based on the received sensor data from the one or more sensors.

2. The multifunction interactive power tool according to claim 1, wherein the one or more sensors includes an image sensor.

3. The multifunction interactive power tool according to claim 1, wherein the one or more sensors includes a near field communication reader.

4. The multifunction interactive power tool according to claim 1, wherein the one or more sensors includes a laser rangefinder and an inertial measurement unit.

5. The multifunction interactive power tool according to claim 1, wherein the processing circuitry is further configured to update the image data by
generating an alert to a user via the video display when an alert threshold has been overcome.

6. The multifunction interactive power tool according to claim 1, wherein the housing further houses a speaker and the processing circuitry is further configured to
generate an audible alert to a user via the speaker when an alert threshold has been overcome.

7. The multifunction interactive power tool according to claim 1, wherein the housing further houses a haptic motor electrically-coupled to the power source and the processing circuitry is further configured to
generate a vibratory alert to a user via the haptic motor when an alert threshold has been overcome.

8. The multifunction interactive power tool according to claim 1, further comprising
a wireless communication module, wherein the processing circuitry is in wireless communication with an Internet-based server via the wireless communication module, the processing circuitry being further configured to
transmit the type of the attachment to the Internet-based server, the type of the attachment being associated with a user application.

9. The multifunction interactive power tool according to claim 1, further comprising
a wireless communication module, wherein the processing circuitry is in wireless communication with an Internet-based server via the wireless communication module, the processing circuitry being further configured to
transmit the sensor data to the Internet-based server, wherein the Internet-based server analyzes the sensor data using artificial intelligence algorithms.

10. The multifunction interactive power tool according to claim 1, further comprising
a wireless communication module, wherein the processing circuitry is in wireless communication with an Internet-based server via the wireless communication module, the processing circuitry being further configured to
receive configuration data from the Internet-based server, and
configure the interactive power tool according to the configuration data.

11. The multifunction interactive power tool according to claim 1, further comprising
a wireless communication module, wherein the processing circuitry is in wireless communication with an Internet-based server via the wireless communication module, the processing circuitry being further configured to
receive video data from the Internet-based server, and
display the video data via the video display.

12. The multifunction interactive power tool according to claim 1, further comprising
a wireless communication module, wherein the processing circuitry is in wireless communication with an Internet-based server via the wireless communication module, the processing circuitry being further configured to
track received user input, and
transmit the received user input to the Internet-based server, wherein the Internet-based server analyzes the user input using artificial intelligence algorithms.

13. The multifunction interactive power tool according to claim 1, further comprising
a motor, within the housing, electrically-coupled to the power source and configured to control the attachment according to the processing circuitry using field oriented control.

14. The multifunction interactive power tool according to claim 1, wherein the attachment is associated with at least one of a torque wrench, a chuck, a vacuum, a carjack, and a scrubber.

15. The multifunction interactive power tool according to claim 1, wherein the video display has a diameter of between 1.2 inches to 2 inches.

16. A multifunction interactive power tool, comprising:
a power source;
a video display mounted on a surface of a housing, the video display being integrated with a touch sensitive display;
one or more sensors attached to the housing; and
processing circuitry, within the housing and electrically coupled to the power source, configured to
identify a type of attachment connected to the interactive power tool, the attachment being configured to accept any consumable compatible with the attachment;
dynamically switch the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool,
receive sensor data from the one or more sensors, and
update the image data based on the received sensor data from the one or more sensors.

17. The multifunction interactive power tool according to claim 16, further comprising
a wireless communication module, wherein the processing circuitry is in wireless communication with an Internet-based server via the wireless communication module, the processing circuitry being further configured to
receive configuration data from the Internet-based server, and
configure the interactive power tool according to the configuration data.

18. A multifunction interactive power tool, comprising:
a power source;
a video display mounted on a surface of a housing, the video display being integrated with a touch sensitive display;
one or more sensors attached to the housing, wherein at least one of the one or more sensors is an image sensor; and
processing circuitry, within the housing and electrically coupled to the power source, configured to
identify a type of attachment connected to the interactive power tool, the attachment being configured to accept any consumable compatible with the attachment;
dynamically switch the video display to display image data associated with the type of attachment in response to identification of the type of attachment connected to the interactive power tool and to display selectable options actuatable via the touch sensitive display corresponding to functionality of the attachment in response to identification of the type of attachment connected to the interactive power tool, receive sensor data from the one or more sensors, and update the image data based on the received sensor data from the one or more sensors and generate an alert to a user via the video display when an alert threshold has been overcome.

19. The multifunction interactive power tool according to claim 18, further comprising a wireless communication module, wherein the processing circuitry is in wireless communication with an Internet-based server via the wireless communication module, the processing circuitry being further configured to receive configuration data from the Internet-based server, and configure the interactive power tool according to the configuration data.

20. The multifunction interactive power tool according to claim 19, wherein the one or more sensors includes an image sensor.

* * * * *